(12) United States Patent
Takahashi et al.

(10) Patent No.: US 12,442,862 B2
(45) Date of Patent: Oct. 14, 2025

(54) DEVICE DETECTING ABNORMALITY OF SECONDARY BATTERY, ABNORMALITY DETECTION METHOD, AND PROGRAM

(71) Applicant: SEMICONDUCTOR ENERGY LABORATORY CO., LTD., Atsugi (JP)

(72) Inventors: Kei Takahashi, Kanagawa (JP); Kouhei Toyotaka, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 20 days.

(21) Appl. No.: 18/377,458

(22) Filed: Oct. 6, 2023

(65) Prior Publication Data

US 2024/0118344 A1 Apr. 11, 2024

Related U.S. Application Data

(62) Division of application No. 16/960,375, filed as application No. PCT/IB2018/060597 on Dec. 25, 2018, now abandoned.

(30) Foreign Application Priority Data

Jan. 11, 2018 (JP) .................................. 2018-002680
Feb. 2, 2018 (JP) ................................. 2018-017091

(51) Int. Cl.
*G01R 31/3842* (2019.01)
*G01R 19/165* (2006.01)
(Continued)

(52) U.S. Cl.
CPC ... *G01R 31/3842* (2019.01); *G01R 19/16576* (2013.01); *G01R 31/367* (2019.01); *H01M 10/0525* (2013.01); *H01M 10/48* (2013.01)

(58) Field of Classification Search
CPC .............. G01R 31/3842; G01R 31/367; G01R 31/392; G01R 31/3648; G01R 31/374;
(Continued)

(56) References Cited

U.S. PATENT DOCUMENTS 6,046,553 A 4/2000 Matsunaga et al.
7,626,394 B2 12/2009 Kimura et al.
(Continued)

FOREIGN PATENT DOCUMENTS

CN 101243325 A 8/2008
CN 101460859 A 6/2009
(Continued)

OTHER PUBLICATIONS

International Search Report (Application No. PCT/IB2018/060597) dated Apr. 23, 2019.
(Continued)

*Primary Examiner* — Catherine T. Rastovski
*Assistant Examiner* — Lal Ce Mang
(74) *Attorney, Agent, or Firm* — NIXON PEABODY LLP; Jeffrey L. Costellia

(57) ABSTRACT

A secondary battery control system that conducts abnormality detection while predicting other parameters (internal resistance, SOC, and the like) with high accuracy is provided. A difference between an observation value (voltage) at a certain point in time and a voltage that is estimated using a prior-state variable is sensed. A threshold voltage is set in advance, and from the voltage difference that is sensed, a sudden abnormality, specifically a micro-short circuit or the like is detected. Furthermore, it is preferable that detection be performed by using a neural network to learn data on voltage difference in a time series and determine abnormality or normality.

6 Claims, 18 Drawing Sheets

(51) Int. Cl.
*G01R 31/367* (2019.01)
*H01M 10/0525* (2010.01)
*H01M 10/48* (2006.01)

(58) Field of Classification Search
CPC .. G01R 31/52; G01R 19/16576; G01R 19/10; G01R 19/1659; H01M 10/0525; H01M 10/48; H01M 10/425; H01M 2300/0065; Y02E 60/10; H02J 7/00; H02J 7/0047; B60L 58/10; G06N 3/08; G06N 20/00
See application file for complete search history.

(56) References Cited

U.S. PATENT DOCUMENTS

| | | | |
|---|---|---|---|
| 8,129,996 | B2 | 3/2012 | Iwane et al. |
| 8,148,993 | B2 | 4/2012 | Yamabe et al. |
| 8,269,463 | B2 | 9/2012 | Nakashima et al. |
| 8,749,204 | B2 | 6/2014 | Majima et al. |
| 9,091,739 | B2 | 7/2015 | Iwane et al. |
| 9,329,240 | B2 | 5/2016 | Baba et al. |
| 9,331,510 | B2 | 5/2016 | Koyama |
| 9,419,314 | B2 | 8/2016 | Koch et al. |
| 9,490,646 | B2 | 11/2016 | Kubota et al. |
| 10,203,376 | B2 | 2/2019 | Fukuhara |
| 10,203,377 | B2 | 2/2019 | Fukuhara |
| 10,345,385 | B2 | 7/2019 | Wampler et al. |
| 10,809,302 | B2 | 10/2020 | Yuan et al. |
| 11,372,050 | B2 | 6/2022 | Kim et al. |
| 2005/0073314 | A1 | 4/2005 | Bertness et al. |
| 2006/0181245 | A1 | 8/2006 | Mizuno et al. |
| 2008/0162059 | A1* | 7/2008 | Murakami ......... G01R 31/3842 702/63 |
| 2009/0128159 | A1 | 5/2009 | Nakatsuji |
| 2009/0228225 | A1* | 9/2009 | Burgess ............... G01R 31/367 702/63 |
| 2012/0169288 | A1 | 7/2012 | Ueki et al. |
| 2013/0093430 | A1 | 4/2013 | Hagimori et al. |
| 2013/0297243 | A1 | 11/2013 | Baba et al. |
| 2015/0357856 | A1 | 12/2015 | Tanabe et al. |
| 2016/0018345 | A1* | 1/2016 | Park .................... G01R 31/367 702/63 |
| 2016/0380313 | A1 | 12/2016 | Morita et al. |
| 2017/0126027 | A1 | 5/2017 | Park |
| 2017/0170782 | A1* | 6/2017 | Yoscovich ............. H02S 50/00 |
| 2017/0356964 | A1 | 12/2017 | Heiries et al. |
| 2018/0024200 | A1 | 1/2018 | Hiwa |
| 2021/0055348 | A1 | 2/2021 | Kim et al. |

FOREIGN PATENT DOCUMENTS

| | | | |
|---|---|---|---|
| CN | 102282477 | A | 12/2011 |
| CN | 103048624 | A | 4/2013 |
| CN | 103091636 | A | 5/2013 |
| CN | 103328997 | A | 9/2013 |
| CN | 103368146 | A | 10/2013 |
| CN | 105492917 | A | 4/2016 |
| CN | 106067570 | A | 11/2016 |
| CN | 107024659 | A | 8/2017 |
| CN | 107064803 | A | 8/2017 |
| CN | 107250824 | A | 10/2017 |
| EP | 1933158 | A | 6/2008 |
| EP | 2378303 | A | 10/2011 |
| EP | 2642307 | A | 9/2013 |
| EP | 2667211 | A | 11/2013 |
| EP | 3040732 | A | 7/2016 |
| EP | 3040733 | A | 7/2016 |
| EP | 3557269 | A | 10/2019 |
| EP | 3623829 | A | 3/2020 |
| JP | 2006-105821 | A | 4/2006 |
| JP | 2008-135310 | A | 6/2008 |
| JP | 2010-066161 | A | 3/2010 |
| JP | 2010-210457 | A | 9/2010 |
| JP | 2012-122787 | A | 6/2012 |
| JP | 2013-117410 | A | 6/2013 |
| JP | 2013-118757 | A | 6/2013 |
| JP | 2015-184219 | A | 10/2015 |
| JP | 2016-114584 | A | 6/2016 |
| JP | 5970563 | B2 * | 8/2016 ............ B60L 3/0046 |
| JP | 2016/038658 | | 4/2017 |
| JP | 2017-122622 | A | 7/2017 |
| WO | WO-2012/098770 | | 7/2012 |
| WO | WO-2015/029832 | | 3/2015 |
| WO | WO-2016/059869 | | 4/2016 |
| WO | WO-2017/119393 | | 7/2017 |
| WO | WO-2019/074221 | | 4/2019 |
| WO | WO-2019/193471 | | 10/2019 |

OTHER PUBLICATIONS

Written Opinion (Application No. PCT/IB2018/060597) dated Apr. 23, 2019.

Taiwanese Office Action (Application No. 108101235) dated Jan. 7, 2023.

Chinese Office Action (Application No. 201880085109.6) dated Feb. 11, 2023.

* cited by examiner

600

Charging

DEVICE DETECTING ABNORMALITY OF SECONDARY BATTERY, ABNORMALITY DETECTION METHOD, AND PROGRAM

TECHNICAL FIELD

One embodiment of the present invention relates to an object, a method, or a manufacturing method. Alternatively, the present invention relates to a process, a machine, manufacture, or a composition (a composition of matter). One embodiment of the present invention relates to a manufacturing method of a semiconductor device, a display device, a light-emitting device, a power storage device, a lighting device, or an electronic device. In addition, one embodiment of the present invention relates to a method of controlling charge of a power storage device, a method of estimating the state of a power storage device, and a method of detecting abnormality of a power storage device. In particular, one embodiment of the present invention relates to a charge system of a power storage device, a state estimation system of a power storage device, and an abnormality detection system of a power storage device.

Note that in this specification, a power storage device refers to every element and device having a function of storing power. For example, the power storage device includes a storage battery (also referred to as secondary battery) such as a lithium-ion secondary battery, a lithium-ion capacitor, a nickel hydrogen battery, an all-solid-state battery, and an electric double layer capacitor.

One embodiment of the present invention relates to an abnormality detection system of a power storage device and a state estimation device of a power storage device using a neural network. One embodiment of the present invention relates to vehicles using a neural network. One embodiment of the present invention relates to an electronic device using a neural network. One embodiment of the present invention is not limited to vehicles, and is related to a state estimation system and an abnormality detection system that can be applied to a power storage device for storing electric power obtained from power generation facilities such as a solar power generation panel provided in a structure body.

BACKGROUND ART

In recent years, a variety of power storage devices such as lithium-ion secondary batteries, lithium-ion capacitors, and air batteries have been actively developed. In particular, demand for lithium-ion secondary batteries with high energy density have rapidly grown with the development of the semiconductor industry for portable information terminals such as mobile phones, smartphones, tablets, or laptop computers; game machines; portable music players; digital cameras; medical equipment; next-generation clean energy vehicles such as hybrid electric vehicles (HEVs), electric vehicles (EVs), and plug-in hybrid electric vehicles (PHEVs); electric bikes; or the like, and lithium-ion secondary batteries have become essential as rechargeable energy supply sources for the modern information society.

Electric vehicles are vehicles in which only an electric motor is used for a driving portion, and there are also hybrid vehicles having both an internal-combustion engine such as an engine and an electric motor. A plurality of secondary batteries used in vehicles are provided as a battery pack, and a plurality of the battery packs are provided on the lower portion of a vehicle.

The secondary battery used in an electric vehicle, a hybrid electric vehicle or an electric bike degrades due to the number of charging, depth of discharge, charge current, charging environment (temperature change), or the like. The degradation also depends on the usage of the user; and charging temperatures, frequency of quick charging, charging amount from regenerative braking, charging timing with a regenerative brake, and the like might be related to the degradation. An abnormality such as a short circuit may occur in the secondary battery used in an electric vehicle or a hybrid electric vehicle due to degradation over time or the like.

Having a high reliability is desirable for the secondary battery used for an electric vehicle, a hybrid electric vehicle, or an electric bike because it is assumed to be used for a long time.

In the design capacity (DC) of a lithium-ion secondary battery, the proportion of the remaining capacity (RC) in the full charge capacity (FCC), that is, the state of charge (SOC), is not set to use all of the design capacity from 0% to 100%, and a margin of 5% (or 10%), not 0%, is provided to prevent overdischarge. In addition, to prevent overcharge, a margin of approximately 5% (or 10%), not 100%, is provided; accordingly, a design capacity within a range of 5% to 95% (or within a range of 10% to 90%) is said to be used. In practice, a design capacity of 5% to 95% (or within a range of 10% to 90%) is used by setting the voltage range of an upper limit voltage $V_{max}$ and a lower limit voltage $V_{min}$ using a BMS (Battery Management System) connected to a secondary battery.

Degradation in a secondary battery occurs due to usage, change over time, or change in temperature. The secondary battery is managed by accurately determining the state of the inside of the secondary battery, particularly the SOC (state of charge). By accurately determining the SOC, the voltage range of the upper limit voltage $V_{max}$ and the lower limit voltage $V_{min}$ can be widened. Conventionally, the SOC is estimated by a coulomb counting method.

Patent Document 1 shows an example where a neural network is used for calculation of the remaining capacity of a secondary battery.

REFERENCE

Patent Document

[Patent Document 1] United States Published Patent Application No. 2006/0181245

SUMMARY OF THE INVENTION

Problems to be Solved by the Invention

An object is to secure safety by sensing abnormality in a secondary battery, for example, sensing a phenomenon that lowers the safety of the secondary battery early and warning users or changing the operating conditions of the secondary battery.

In a conventional abnormality detection of a secondary battery, when the secondary battery degrades and errors occur, corrections are required; however, corrections by feedback are not made and are insufficient, hence the accuracy is low. An object is to increase the accuracy of abnormality detection of a secondary battery.

In the case where a large noise is generated in a secondary battery, when monitoring the internal resistance, SOC, and the like of the secondary battery, an error of the numerical value of the SOC to be estimated later occurs due to the noise data that is input. An object is to provide a control system of a secondary battery that ideally predicts other parameters (internal resistance, SOC, and the like) with high accuracy while performing abnormality detection.

Means for Solving the Problems

In a lithium-ion battery, only parameters of a current, a voltage, and a temperature can be measured, and it is difficult to measure the internal resistance and the SOC (state of charge) directly. Therefore, arithmetic processing using a regression model (regression method) such as a regression analysis, a Kalman filter, and a multiple regression analysis is performed to estimate the internal resistance and the SOC.

A Kalman filter is a kind of infinite impulse response filter. A multiple regression analysis is a multivariate analysis and uses a plurality of independent variables in a regression analysis. Examples of the multiple regression analysis include a least-squares method. The regression analysis requires a large number of observation values of time series, whereas the Kalman filter has an advantage of being able to obtain an optimal correction coefficient successively as long as there is an accumulation of data to some extent. Moreover, the Kalman filter can be applied to transient time series.

As a method of estimating the internal resistance and the SOC of the secondary battery, a non-linear Kalman filter (specifically an unscented Kalman filter (also referred to as UKF)) can be used. In addition, an extended Kalman filter (also referred to as EKF) can be used.

Estimating the internal resistance and the SOC of the secondary battery using a Kalman filter is known, and it is difficult to sense sudden abnormalities, specifically a micro-short circuit and the like, using only this method. When estimating the internal resistance and the SOC of the secondary battery, a post-state estimation value is treated as an output; however, in this invention, a state estimation value is not directly used, and sudden abnormalities can be sensed by using a difference between an observation value and a prior-state estimation value.

In order to achieve the above objects, in the abnormality detection device, the abnormality detection system, and the abnormality detection method of a secondary battery disclosed in this specification, the following means is used.

Using a Kalman filter, a difference between an observation value (voltage) at a certain point in time and a voltage that is estimated using a prior-state variable is sensed. A threshold voltage is set in advance, and a sudden abnormality, specifically a micro-short circuit, is sensed using the sensed voltage difference. An abnormality in a secondary battery can be detected early by sensing a micro-short circuit or the like.

A micro-short circuit refers to a minute short circuit in a secondary battery and a phenomenon in which a short circuit of a positive electrode and a negative electrode of the secondary battery does not make charging and discharging impossible, and a small amount of short-circuit current flows through a minute short circuit portion. A cause of a micro-short circuit is a plurality of charging and discharging; an uneven distribution of positive electrode active materials leads to local concentration of current in part of the positive electrode and the negative electrode; and then part of a separator stops functioning or a by-product is generated by a side reaction, which is thought to generate a micro short-circuit.

A thinner separator to make a secondary battery smaller and quick electric power supply at a high voltage are desired for an ideal secondary battery, both of which have configurations that allow a micro-short circuit to occur in a secondary battery easily. Moreover, repetition of micro-short circuits may cause abnormal heating in a secondary battery, and may lead to serious accidents such as a fire.

Thus, an abnormality detection system, a secondary battery control system, or a secondary battery charging system is configured for early sensing and preventing serious accidents from happening in the case where a micro-short circuit occurs. A micro-short circuit is an abnormality particular to a secondary battery, and thus far, a method or a system of paying attention to the micro-short circuit and sensing the micro-short circuit has not existed. The present inventors build a system that finds and calculates a value that changes greatly when a micro-short occurs. In addition, correction by feedback is provided using an AI (Artificial Intelligence) system (neural network) to perform sensing of an abnormality in a secondary battery.

A measurement model for performing sensing of an abnormality in a secondary battery is described below. Here, the model is a model of an abnormality detection system of a secondary battery, and output from the system is determined by calculation according to the steps for inputting to the system that have been established in advance or performing a simulation. A method (for example, a neural network, a hidden Markov model, a polynomial function approximation, or the like) for determining an optimal output with respect to an input of the system by means such as regression and learning is used as a model. These models are examples, and are not limited.

In a prior-estimate prediction step, a model and an input value are used, and in a post-estimate step (also referred to as a filtering step), an observation value is used.

$$x(k+1)=Ax(k)+bu(k)+bv(k) \qquad \text{[Equation 1]}$$

The above equation is a state equation that expresses the transition of the system.

The relationship between an observation value y(k) and x(k) in a point in time (time k) is represented by the following.

$$y(k)=c^T x(k)+w(k) \qquad \text{[Equation 2]}$$

$c^T$ is an observation model that has a function of linear mapping a state space into an observation space. w(k) represents an observation noise. The above equation is an observation equation.

The state equation and the observation equation are collectively called state space.

The prior-state estimation value (on the left) can be expressed by the following equation.

$$\hat{x}^-(k)=A\hat{x}(k-1)+bu(k-1) \qquad \text{[Equation 3]}$$

Note that k is an integer of 0, 1, 2, or the like, and k represents time. u(k) is an input signal and is a combined current value in the case of a secondary battery, and x(k) expresses a state variable.

In addition, a prior error covariance ($P^-(k)$ on the left represents an inverse matrix of a covariance matrix) can be expressed by the following equation.

$$P^-(k)=AP(k-1)A^T+\sigma_v^2 bb^T \qquad \text{[Equation 4]}$$

In the prior-estimate prediction step, the prior-state estimation value and a prior covariance matrix of a state are calculated in accordance with the state equation. A prior-state estimation value and a prior covariance matrix at time k+1 are calculated in accordance with a post-state estimation value and a post covariance matrix of a state at time k.

An estimation value and an actual measurement of the voltage (the observation value) are compared, and a Kalman gain which is a weight coefficient of a difference is calculated using a Kalman filter, after which the estimation value is corrected. The Kalman gain g(k) used in the filtering step can be expressed by the following equation.

$$g(k) = \frac{P^-(k)c}{c^T P^-(k)c + \sigma_\omega^2} \quad \text{[Equation 5]}$$

A post-state estimation value (on the left) used in the filtering step can be expressed by the following equation.

$$\hat{x}(k) = \hat{x}^-(k) + g(k)(y(k) - c^T \hat{x}^-(k)) \quad \text{[Equation 6]}$$

A post error covariance matrix P(k) used in the filtering step can be expressed by the following equation.

$$P(k) = (I - g(k)c^T)P^-(k)_v \quad \text{[Equation 7]}$$

With the above measurement model of sensing an abnormality that occur in a secondary battery, the value obtained from the equation below, that is, a difference (voltage difference) between an observation value (voltage) at a certain point in time and a voltage that is estimated using a prior-state variable is monitored, and abnormality is sensed by regarding a large change in behavior of the value as an occurrence of abnormality such as a micro-short circuit.

$$y(k) - c^T \hat{x}^-(k) \quad \text{[Equation 8]}$$

In the case where a comparator or the like outputs a signal when the value of voltage difference obtained from the equation above exceeds a certain threshold value and an abnormality is sensed, a signal for displaying that notifies the outside with an abnormality signal is output to a display or a signal for warning with a buzzer or the like is output to a speaker. In this specification, the terms "sensing" and "detection" are used separately. "Detection" refers to a case where an abnormality data is sensed, and when the abnormality data is correct, notification to the outside, that is, a signal is output to other circuits. "Sensing" is defined as only picking up abnormality data including noise (abnormality data that is incorrect). Therefore, "sensing" is part of but does not equate to "detection", and "detection" at least includes notifying (outputting a signal) to other circuits.

When a charging state is switched to a discharging state, or when a discharging state is switched to a charging state, the voltage difference changes greatly and noise is generated. The generation of this noise does not lead to an abnormality in a secondary battery, and thus a plurality of comparators can be provided to remove this noise.

A structure disclosed in this specification is an abnormality detection device including a first sensing means that senses a voltage value of a secondary battery that is to be a first observation value; a second sensing means that senses a current value of the secondary battery that is to be a second observation value; a calculation unit that calculates a prior-state estimation value (estimated voltage value) using a Kalman filter on the basis of a state equation; and a determination unit that finds a difference between the voltage value of the first observation value and the estimated voltage value obtained from a previous time and determines that the secondary battery has an abnormality (micro-short circuit) when the difference exceeds a certain threshold value range.

In the above structure, the determination unit includes one or a plurality of comparators. By using a plurality of comparators, noise can be removed and errors in abnormality sensing can be reduced.

It is preferable that detection be performed by learning data on voltage difference in a time series using a neural network and determining abnormality or normality. The above structure includes a neural network structure portion that inputs a difference between the voltage value of the first observation value and the estimated voltage value obtained from the previous time.

Another structure disclosed in this specification is an abnormality detection method determining whether a secondary battery has an abnormality, and includes a prior-estimate prediction step outputting an estimated voltage value using a Kalman filter on the basis of a state equation and a filtering step calculating a post-state estimation value and a post error covariance matrix.

Another structure disclosed in this specification is a program that makes a computer function as a calculation unit that calculates a prior-state estimation value (estimated voltage value) using a Kalman filter on the basis of a state equation and a determination unit that finds a difference between a voltage value of the observation value and the estimated voltage value obtained from a previous time and determines that the secondary battery has an abnormality when the difference exceeds a certain threshold value range.

An abnormality detection system of a secondary battery can be formed using the above abnormality detection device, the above method, and a computer that executes the above program. Examples of the computer includes a control device of an electric vehicle, a smartphone, and a laptop personal computer, and the computer includes a control unit, a memory unit, and an input/output unit. The control unit includes a CPU (or an MPU or an MCU (Micro Controller Unit)) or the like. The control unit can also use a GPU (Graphics Processing Unit). A chip in which a CPU and a GPU are integrated is sometimes called an APU (Accelerated Processing Unit), and this APU chip can also be used. An IC with an AI system (also referred to as an inference chip) can be used. The IC with an AI system is referred to as a circuit performing neural network calculation (a microprocessor) in some cases.

The memory unit includes a RAM, a ROM, an HDD, or the like. The input/output unit includes an operation portion, a display portion, a communication portion, and the like. The program is not limited to being stored in the memory unit of a computer, and may be stored in a storage medium that the computer can read and the computer reads and executes the program. Examples of a storage medium that the computer can read include a disc such as a CD-ROM, a magnetic tape, a USB memory, and a flash memory. Furthermore, the above program may be stored in a device that is connected to a connection line such as the Internet, a LAN (Local Area Network), or a wireless LAN, and the computer may read the program from the connection line and executes the program.

Another structure disclosed in this specification is an abnormality detection system that detects a micro-short circuit. The abnormality detection system includes a first sensing means that senses a voltage value of a secondary battery that is to be a first observation value; a second sensing means that senses a current value of the secondary battery that is to be a second observation value; a calculation unit that calculates a prior-state estimation value (estimated voltage value) using a Kalman filter on the basis of a state equation; and a determination unit that finds a difference between the voltage value of the first observation value and the estimated voltage value obtained from a previous time and determines that the secondary battery has an abnormality (micro-short circuit) when the difference exceeds a certain threshold value range. The abnormality detection system detects data derived from the micro-short circuit.

The abnormality detection system of a secondary battery disclosed in this specification always or periodically monitors the secondary battery. The sampling cycle (and the calculation cycle) can be set as appropriate. The abnormality detection system of a secondary battery disclosed in this specification can also be called a secondary battery monitoring system. Furthermore, when sensing of an abnormality in a secondary battery such as an external surface temperature or an external deformity using a temperature sensor, a camera, a gas sensor, or the like are included in the abnormality detection system for a secondary battery, an abnormality can be sensed more certainly.

A forecast error determined as an abnormality is not input to a Kalman filter and a forecast error determined as a normality is input instead. The accuracy of the estimation can be increased by calculating the internal resistance and the SOC of a secondary battery without using an abnormal value.

Another structure disclosed in this specification is a state estimation method of a secondary battery that estimates a charging state of a secondary battery. In the state estimation method of a secondary battery, data on an observation value is obtained from the secondary battery; a prior-state estimation value is calculated using a regression model; a forecast error voltage Vd which is a difference between the observation value and the prior-state estimation value is calculated; whether data is noise is determined on the basis of whether or not data of the forecast error voltage Vd exceeds a threshold value set in advance; instead of data that is determined as noise, a mean value of k data before abnormality sensing is input to the regression model after which correction is performed; and abnormality detection is continued even after noise sensing.

A micro-short circuit problem occurs during charging. For example, in the case where only one battery is employed, current is controlled by a charger; thus the perceived current value does not change during a micro-short circuit, and a change in voltage is observed. However, in the case of parallel batteries, the change in voltage becomes small and sensing becomes difficult. Moreover, this change in voltage is within the range of upper and lower limit voltages of battery use, and hence a special detecting mechanism is required. Furthermore, regarding current, in parallel batteries, the internal resistance decreases when a micro-short circuit occurs; hence the amount of current that flows into a healthy battery becomes relatively small and a large amount of current flows into an abnormal battery, which is dangerous. However, it is difficult to detect an abnormality because a controlled value of current is maintained in the whole battery pack. In the case of a structure of a typical battery pack, it is common to monitor the voltage of each set of series; however, monitoring the current of all the batteries is difficult in terms of costs and the complexity of the wirings.

As shown in the flow chart in FIG. 14, when a value is found to be small when compared with a signal REF using a comparator, that is, when the value obtained in Equation 8<REF, an abnormality such as a micro-short circuit is deemed to have occurred, and after sensing this abnormality, forecast error data is created; for example, the mean of normal forecast errors of previous one to four steps is put into the Kalman filter. The SOC can be accurately found even after detecting abnormality. An advantage of the Kalman filter is that the remaining capacity can be forecast with high accuracy, and even if the initial remaining capacity is unknown, the remaining capacity can be forecast.

Hitherto, there is a problem where an error in estimation value occurs before or after a micro-short circuit occurs, and it varies from the actual capacity value. The accuracy of the estimation results can be increased by removing data derived from the occurrence of a micro-short circuit and inputting a normal value.

Thus, data that is the basis of the abnormality detection is not used for prediction after the abnormality detection, whereby a secondary battery can be used until a micro-short circuit occurs again after the abnormality detection.

A prediction method for predicting the charging state of a secondary battery is described below. After abnormality sensing in a secondary battery is carried out, the steps for prediction continue to be repeatedly carried out. In the prediction, a method (for example, a neural network, a hidden Markov model, a polynomial function approximation, or the like) for determining an optimal output with respect to a system input by means such as regression and learning is used. To perform learning, it is preferable to use a large amount of data and analysis for learning; hence the learning may be conducted at a site such as a workstation or an appliance server, and in that case one or more servers are used and data accumulation and analysis are performed automatically or semi-automatically in coordination with an operator. In the case where storage and analysis of a large amount of data have finished and results have been obtained, by integrating the results into a system, specifically a program or a memory such as an IC chip, abnormality sensing and prediction of a charging state can be conducted without using a server.

In the case where power is wirelessly supplied to charge a secondary battery, the abnormality detection system of a secondary battery disclosed in this specification can be used. Methods for wirelessly transmitting power of several watts or more in a distance of several tens of centimeters or less include an electromagnetic induction method and a magnetic resonance method. The electromagnetic induction method includes a Qi (chee) standard. The magnetic resonance method includes a WiPower standard. Power from a power-transmitting device is received by a receiving coil, and an abnormality detection device is provided between the receiving coil and the secondary battery. In the case where the abnormality detection device detects an abnormality, instruction of stopping power from the power-transmitting device using a connection function (a wireless LAN or Blue tooth (registered trademark)) is performed.

An embodiment described below in this specification includes use of a dedicated computer or a general-purpose computer including a variety of kinds of computer hardware or software. A computer-readable recording medium can be used and mounted on the embodiment described below in this specification. The recording medium may include a RAM, a ROM, an optical disk, a magnetic disk, or any other storage media that can be accessed by a computer. Algorithms, components, flows, programs, and the like presented as examples in an embodiment described below in this specification can be implemented in software or implemented in a combination of hardware and software.

Effect of the Invention

By monitoring the value of the above Equation 8 (voltage difference), an easy and highly accurate abnormality sensing of a secondary battery is made possible. Furthermore, performing abnormality sensing of a secondary battery with input of correction by feedback using a neural network enables abnormality sensing of a secondary battery with a higher accuracy.

Moreover, not only abnormality detection of one secondary battery but also abnormality detection of a plurality of secondary batteries connected in series can be performed.

A secondary battery is not limited to a lithium-ion secondary battery using an electrolyte solution, and an all-solid-state battery using a solid electrolyte, a sodium-ion secondary battery, a potassium-ion secondary battery, and the like can be used. A potassium-ion secondary battery has a weak ability in attracting solvents compared with lithium or sodium, and ion can move freely in the electrolyte solution. When the kind or size of the secondary battery is changed, the threshold value is set as appropriate in accordance with the secondary battery. Since a micro-short circuit can also occur in an all solid-state battery, the abnormality detection system disclosed in this specification is useful.

The abnormality detection system disclosed in this specification is useful because it can be mounted on an IC chip or the like, and can be incorporated in part of a system of a vehicle. The abnormality detection system can be an IC chip in which other functional circuits (Random Access Memory (RAM), GPU (Graphics Processing Unit), PMU (Power Management Unit), and the like) are integrated.

The abnormality detection system disclosed in this specification can shorten the timing of sensing and can achieve abnormality sensing in real time. Furthermore, abnormality sensing can be achieved regardless of the state of the secondary battery such as charging or discharging.

Moreover, a secondary battery control system that detects an abnormality in a secondary battery in real time, removes noise used for abnormality detection, and predicts other parameters (internal resistance, SOC, and the like) with high accuracy can be achieved.

BRIEF DESCRIPTION OF THE DRAWINGS

FIG. 2A is a diagram illustrating an example of a functional block, and can be referred to as an estimation logic.

In FIG. 2A, a delay circuit 402 is a circuit for using a state estimation value at time k in an estimation at time (k+1). In FIG. 2A, A and b represent matrices that can be obtained from the model. $C^T$ represents an observed coefficient vector. $Z^{-1}$ represents a delay circuit.

In FIG. 2A, the portion shown by a reference numeral 401 is a portion denoting a difference (voltage difference) between an observation value (voltage) and a voltage that is estimated using a prior-state variable. When the voltage difference changes steeply, a micro-short circuit can be regarded as having occurred, thus whether the battery is abnormal is determined by inputting the value of voltage difference to a comparator 403 and comparing the voltage difference with the threshold value that is provided by a reference voltage (REF) in the comparator 403. The lower value in a comparison between the two values input to the comparator 403 is represented by an output LO. REF may be changed more than once within a period of one step and comparison at multiple levels may be performed.

FIG. 2B illustrates a graph of the relationship between a terminal voltage of a secondary battery, a voltage difference, and time. The horizontal axis represents time and the vertical axis represents voltage. Since the change in the value of the terminal voltage is not very significant, it is difficult to identify the timing at which a micro-short circuit occurs. On the other hand, as shown in FIG. 2B, a steep change is shown in the voltage difference (a voltage difference between an observation value and a prior-state estimation value) at the center, and it matches the timing at which a micro-short circuit occurs. Therefore, the timing at which a micro-short circuit occurs can be determined by monitoring the voltage difference.

Figure 1:
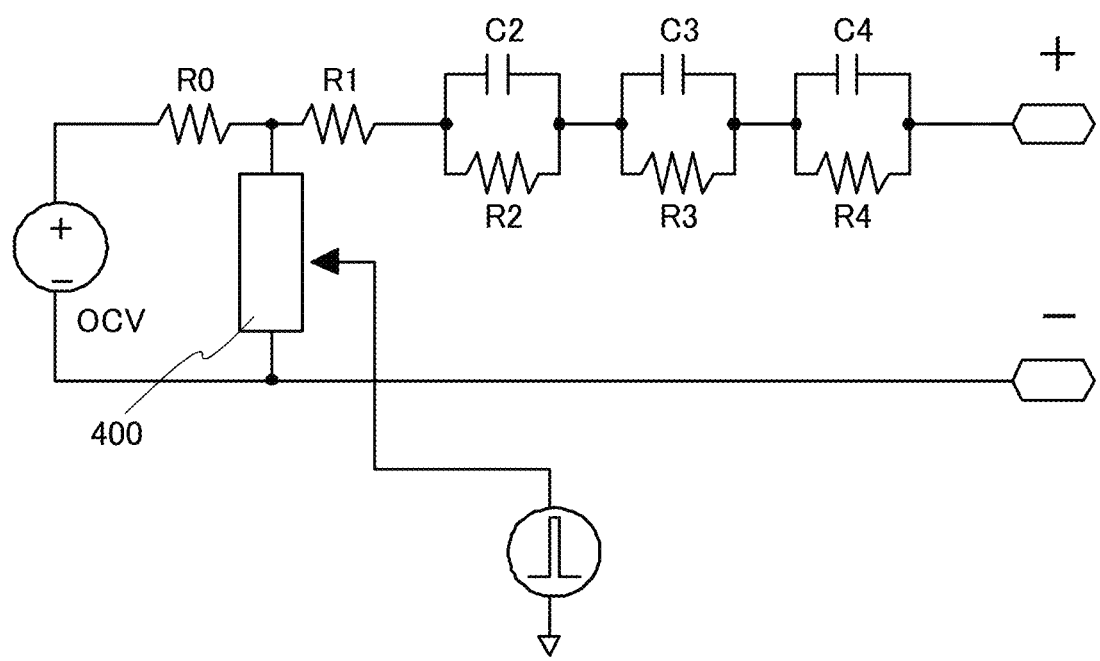
FIG. 1 is an equivalent circuit model illustrating one embodiment of the present invention.
Figure 2A:
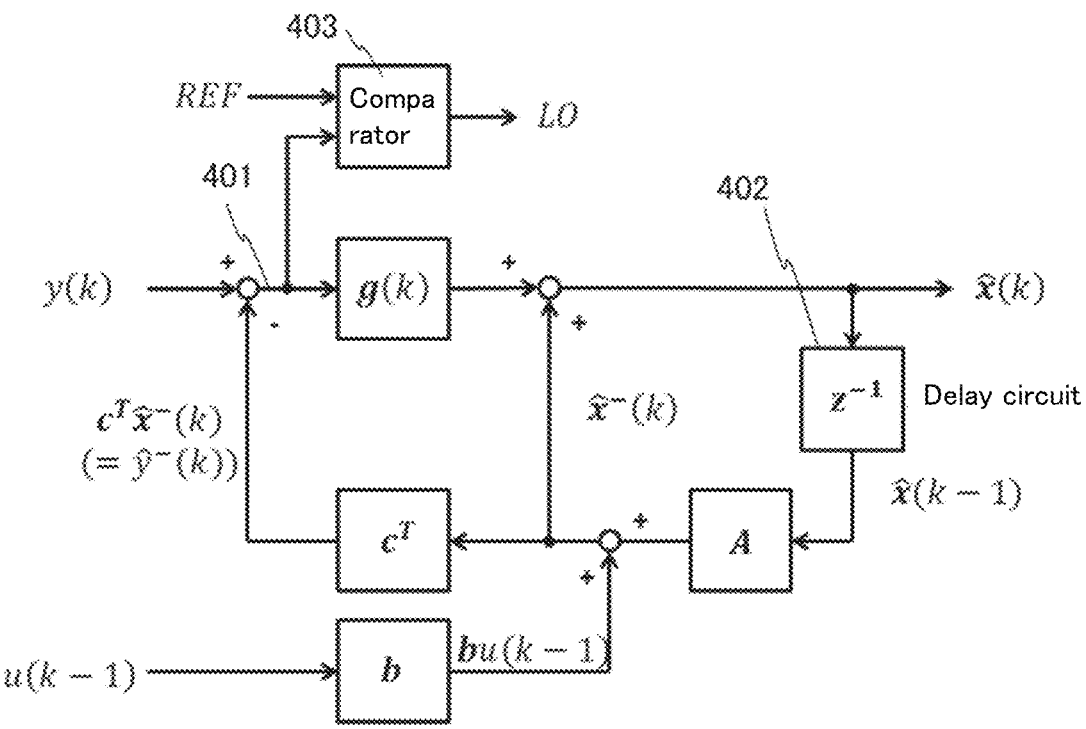
FIG. 2A is a functional block diagram illustrating one embodiment of the present invention.
Figure 2B:
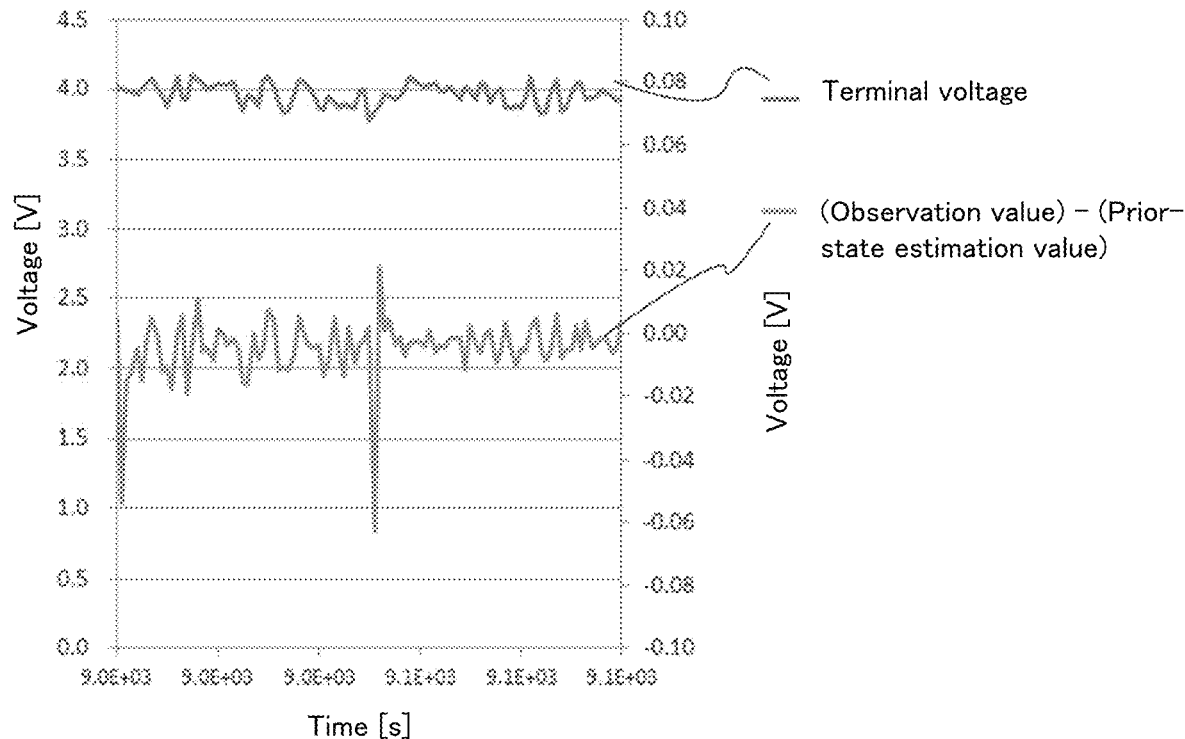
FIG. 2B is a diagram illustrating the relationship between voltage difference and time.

Furthermore, an SOC estimation value can also be output by using an estimation logic illustrated in FIG. 2A that is made partly common by employing the same input data. The SOC estimation value can be output without increasing the size of the circuit.

Figure 3A:
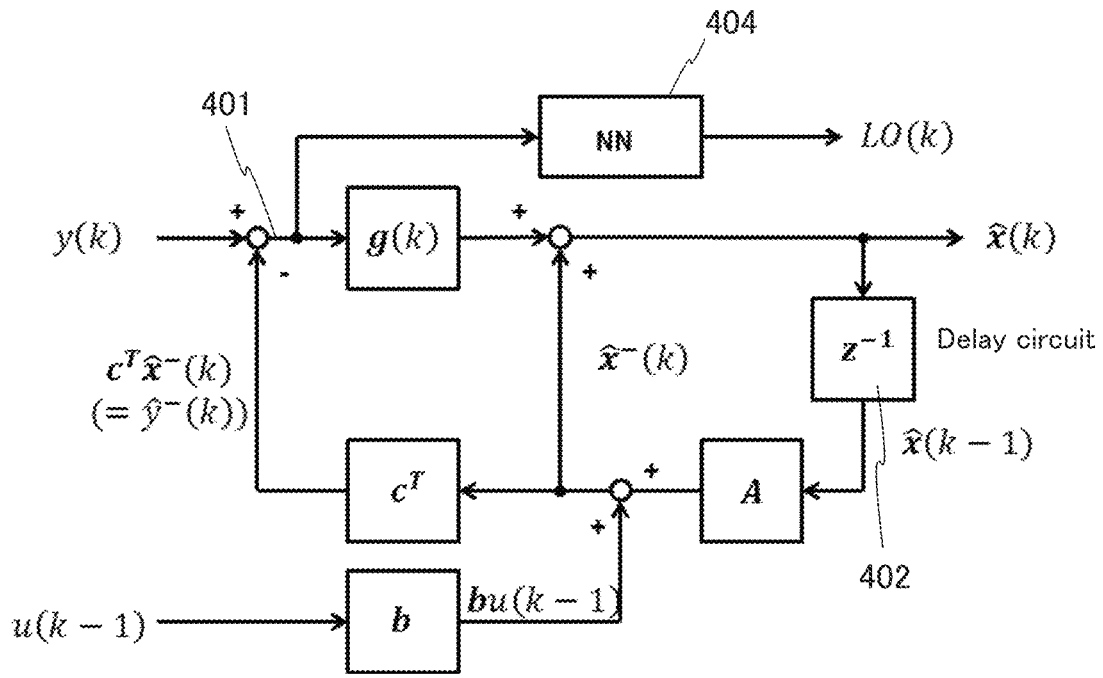
FIG. 3A is a block diagram illustrating one embodiment of the present invention.
Figure 3B:
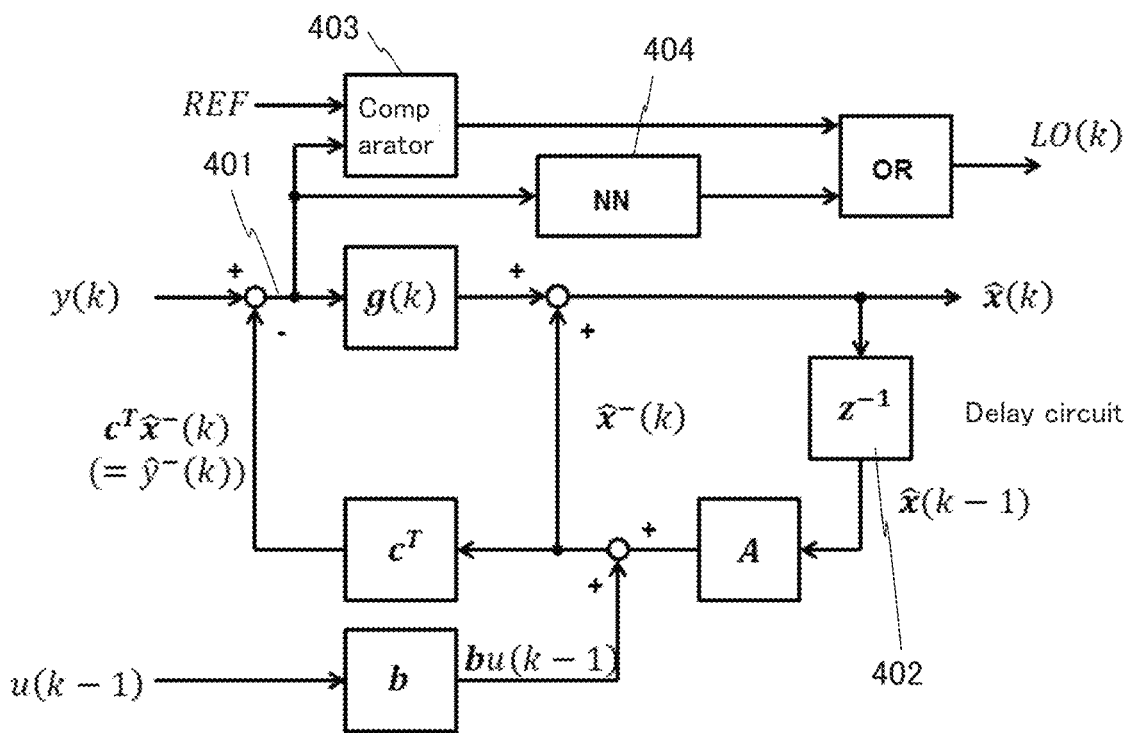
FIG. 3B is a functional block diagram illustrating another embodiment of the present invention.

Each of FIG. 3A and FIG. 3B is a diagram illustrating an example of a functional block. The difference from Embodiment 1 is that each of FIG. 3A and FIG. 3B includes a neural network unit 404. NN in FIG. 3A denotes a neural network unit, and its output is LO(k).

In FIG. 3A, the portion denoted by the reference numeral 401 is a portion denoting a difference (voltage difference) between an observation value (voltage) and a voltage that is estimated using a prior-state variable, and the value of this voltage difference is input to the neural network unit 404 to determine whether there is an abnormality by comparing with learning data. The accuracy can be further increased by accumulating data input to the neural network unit 404 and making the data part of the learning data.

FIG. 3B is one of the other variations. In the functional block illustrated in FIG. 3B, the value of voltage difference is input to both the comparator and the neural network (NN), and OR of the output from both of them is selected. In addition, AND may be selected instead of OR.

Figure 4A:
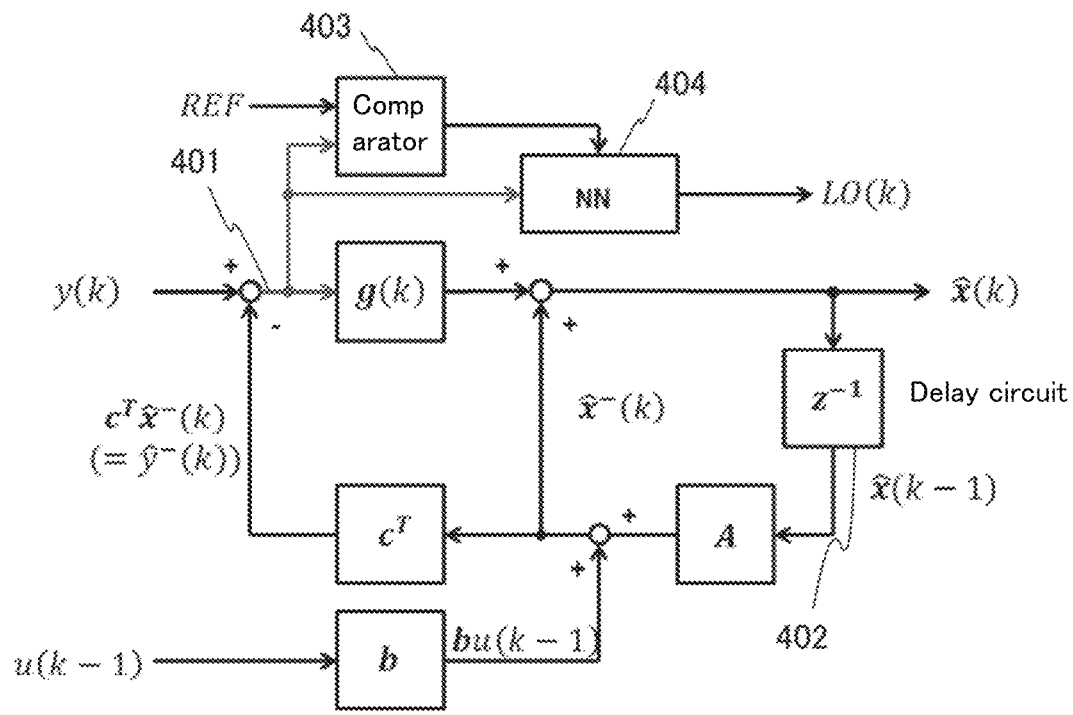
FIG. 4A is a functional block diagram illustrating one embodiment of the present invention.

FIG. 4A is one of the other variations. In the functional block illustrated in FIG. 4A, the output of the comparator is input to the neural network (NN), and abnormality is determined using the value that is output.

Figure 4B:
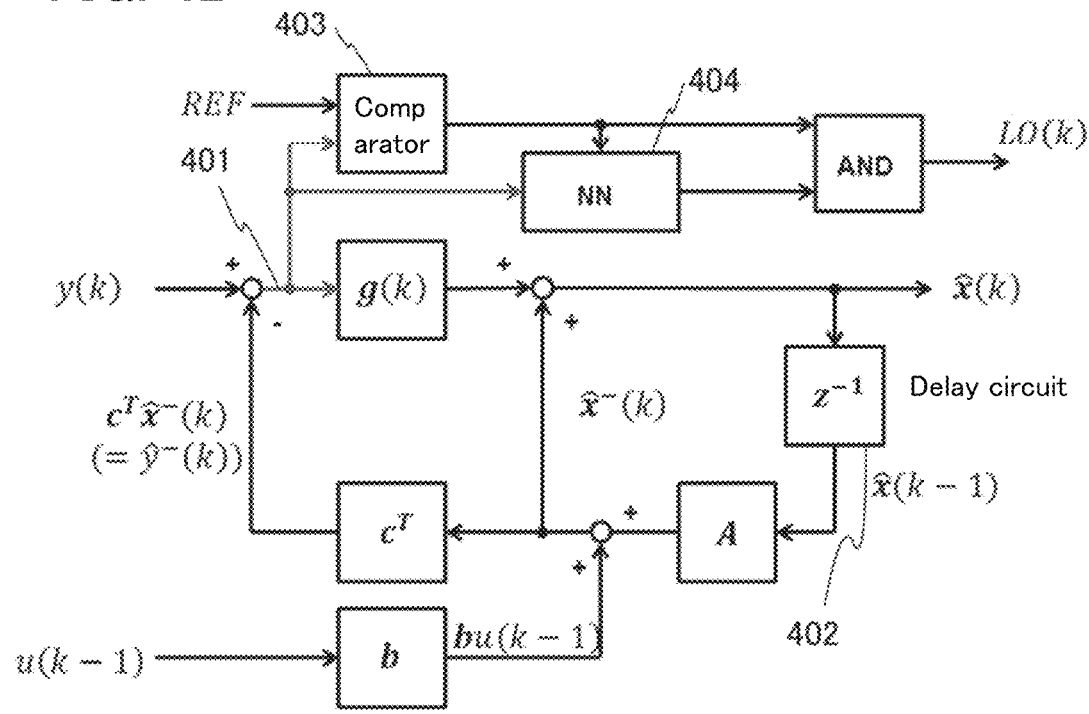
FIG. 4B is a functional block diagram illustrating another embodiment of the present invention.

FIG. 4B is one of the other variations. In the functional block illustrated in FIG. 4B, the output of the comparator is input to the neural network (NN), and abnormality is determined using the value derived from selecting AND of the comparator and the neural network (NN).

Figure 5A:
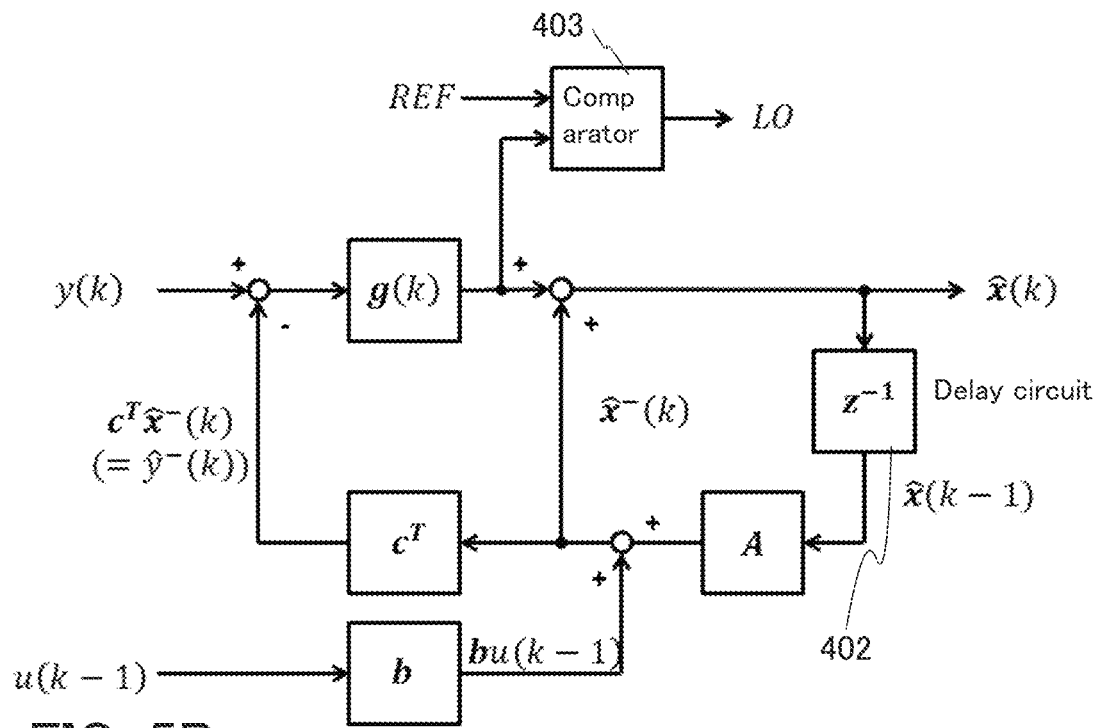
FIG. 5A is a functional block diagram illustrating one embodiment of the present invention.

FIG. 5A is one of the other variations. In the functional block illustrated in FIG. 5A, abnormality is sensed using data that has passed through a Kalman gain g(k).

Figure 6A:
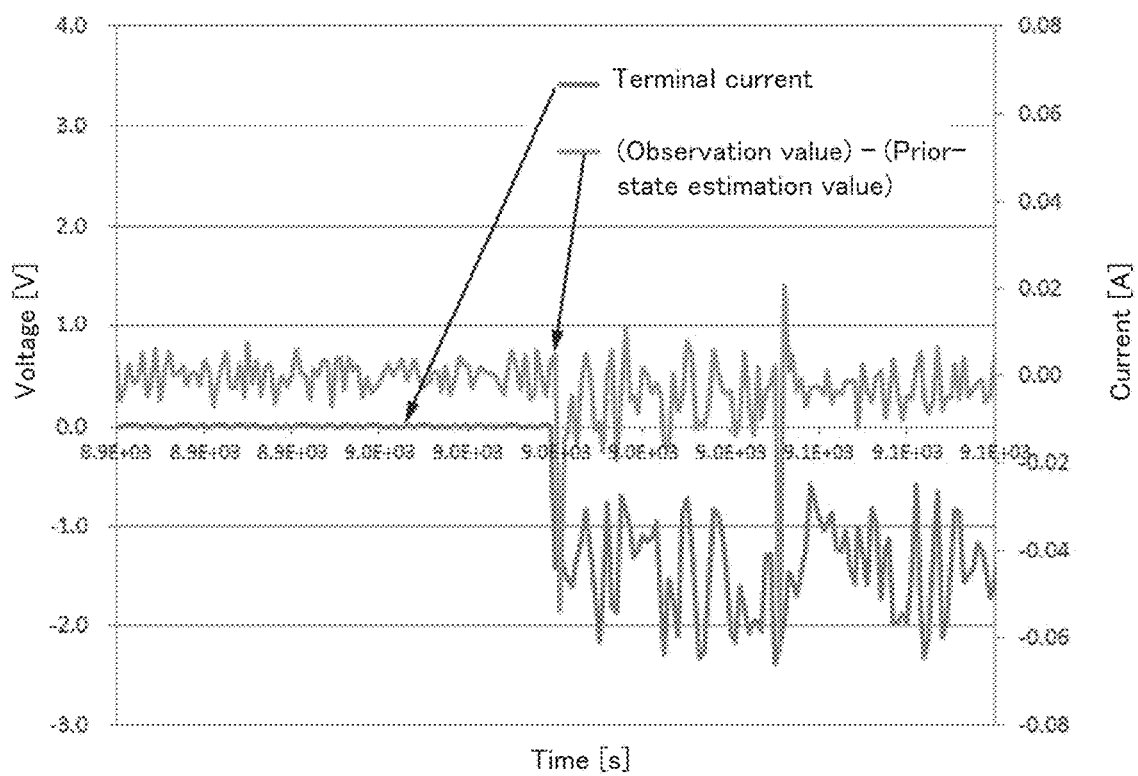
FIG. 6A and FIG. 6B are diagrams illustrating one embodiment of the present invention.

The relationship of the elapsed time and the value of voltage difference was investigated, and it was found that there is an error different from the error when a micro-short circuit occurs. The present inventors have found that an error occurs when switching between charge and discharge in a secondary battery. As illustrated in FIG. 6A, the terminal current changes at the timing of discharge.

Figure 6B:
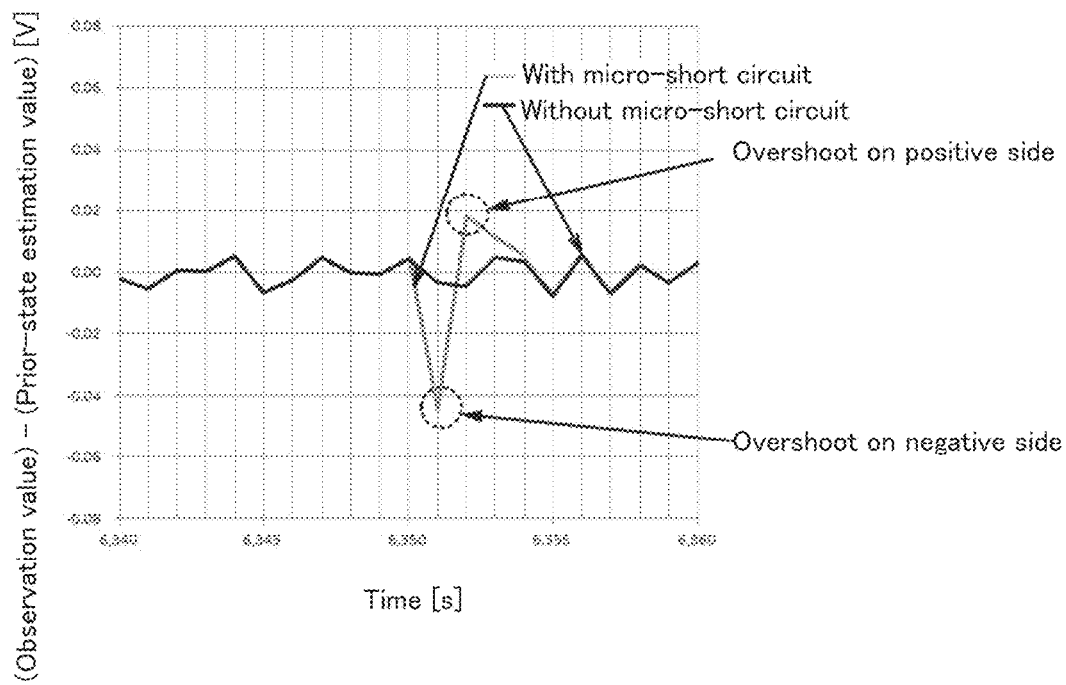

During the switching between charge and discharge, an overshoot on the positive side is not observed. In contrast, as illustrated in FIG. 6B, when a micro-short circuit occurs, overshoots occur both on the positive side and the negative side. The overshoot on the positive side is due to corrections of forecast error being reflected in the next step. The overshoot occurs on the negative side first, after which the overshoot occurs on the positive side. Due to this difference, in the case where an overshoot occurs only on the positive side, the case is deemed as an error and it is determined that a micro-short circuit has not occurred.

Figure 5B:
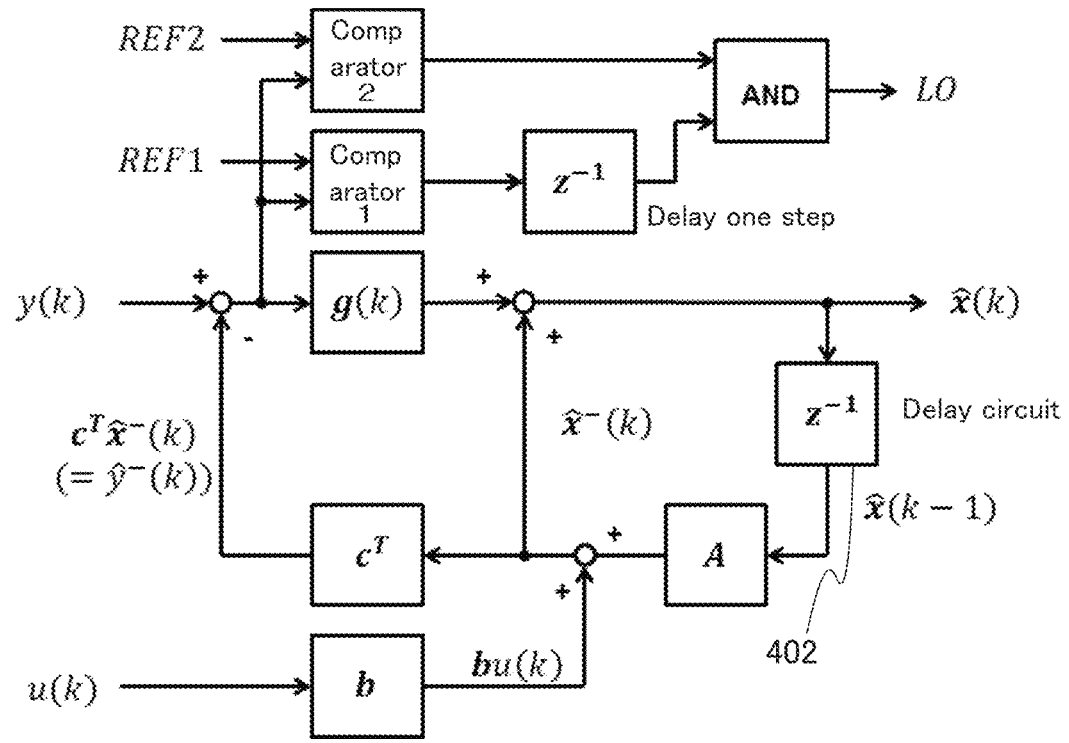
FIG. 5B is a functional block diagram illustrating another embodiment of the present invention.

Two comparators are provided as shown in FIG. 5B; an overshoot value on the negative side (REF1) is input to Comparator 1, an overshoot value on the positive side (REF2) is input to Comparator 2, and an AND calculation of an output of the comparator in a previous one step and an output of the comparator in the present is performed using a delay circuit.

Embodiment 4

Figure 10A:
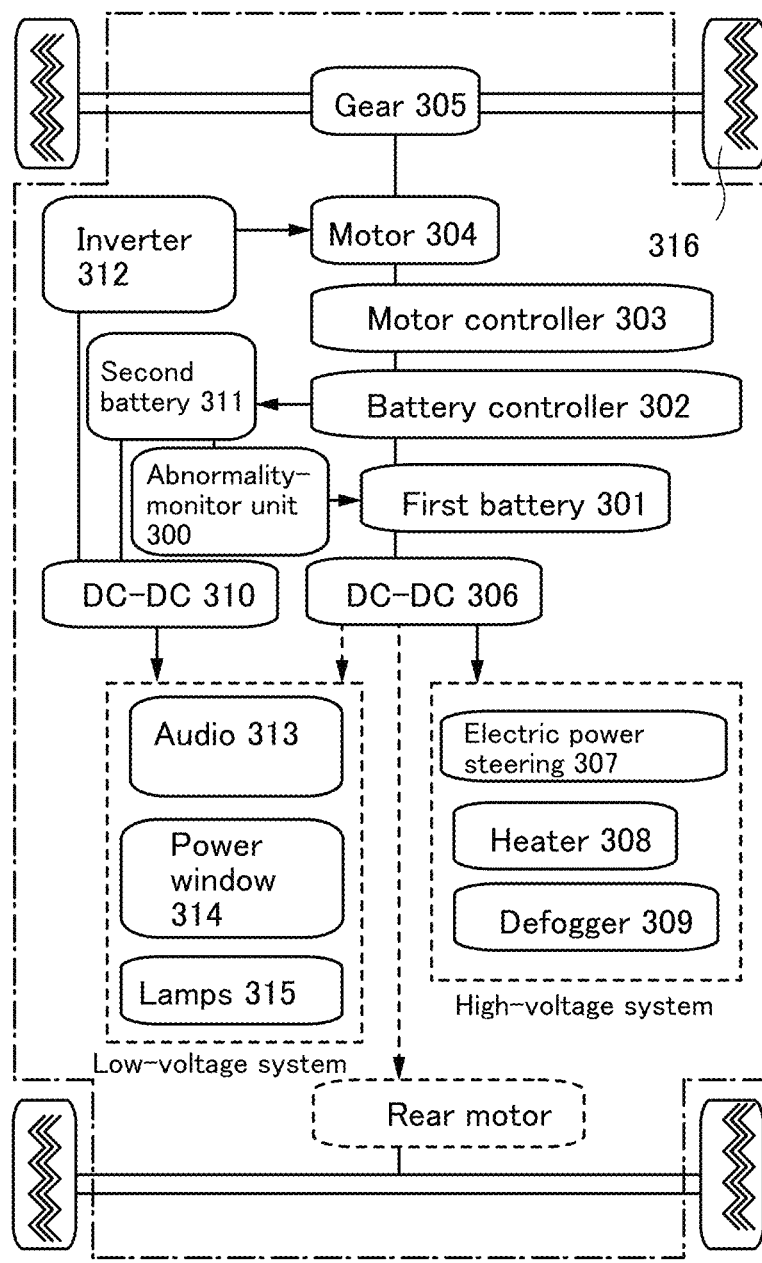
FIG. 10A is a block diagram of an electric vehicle.
Figure 10B:
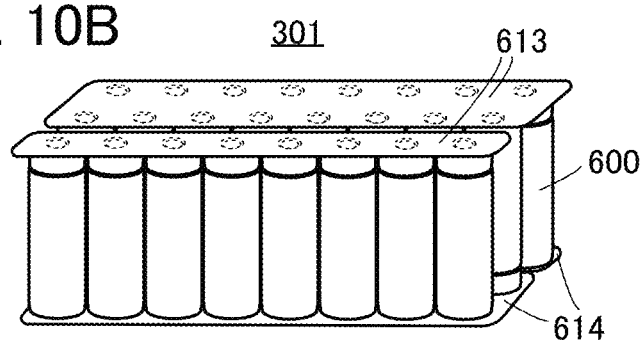
FIG. 10B is a perspective view of a secondary battery illustrating one embodiment of the present invention.

In this embodiment, an example in which the present invention is applied to an electric vehicle (EV) is described using FIG. 10A and FIG. 10B.

FIG. 10A illustrates an example of a block diagram of an electric vehicle.

Figure 12A:
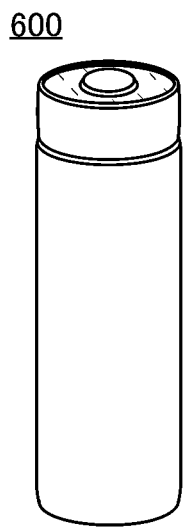
FIG. 12A is a perspective view of a cylindrical secondary battery.

An example of a cylindrical secondary battery is described with reference to FIG. 12A and FIG. 12B. A cylindrical secondary battery 600 includes, as illustrated in FIG. 12A, a positive electrode cap (battery lid) 601 on the top surface and a battery can (outer can) 602 on the side and bottom surfaces. The positive electrode cap and the battery can (outer can) 602 are insulated by a gasket (insulating packing) 610.

Figure 12B:
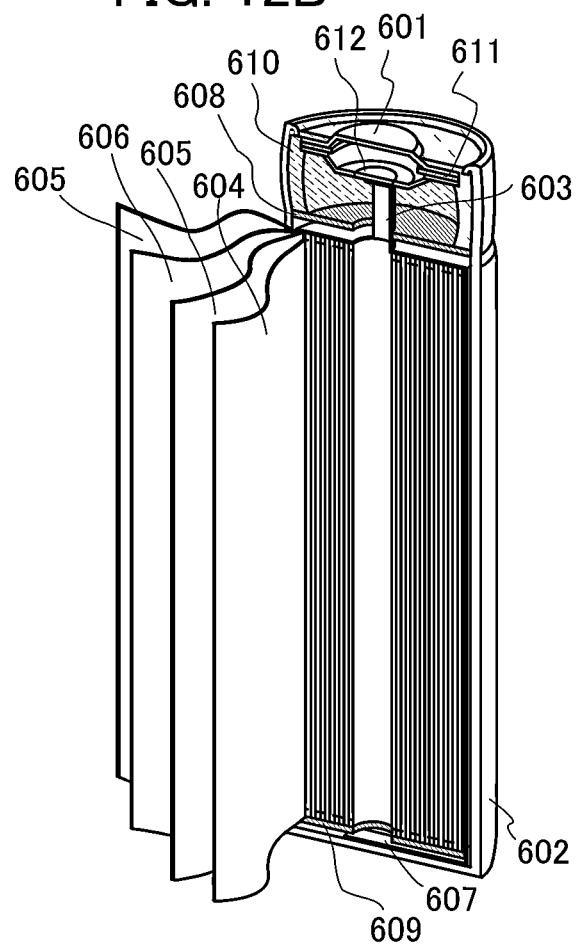
FIG. 12B is a cross-sectional view of the cylindrical secondary battery.

FIG. 12B illustrates a schematic cross-sectional view of the cylindrical secondary battery. Inside the battery can 602 having a hollow cylindrical shape, a battery element in which a belt-like positive electrode 604 and a belt-like negative electrode 606 are wound with a separator 605 located therebetween is provided. Although not illustrated, the battery element is wound around a center pin. One end of the battery can 602 is closed and the other end thereof is opened. For the battery can 602, a metal having corrosion resistance to an electrolyte solution, such as nickel, aluminum, or titanium, an alloy of such a metal, or an alloy of such a metal and another metal (e.g., stainless steel or the like) can be used. The battery can 602 is preferably covered with nickel, aluminum, or the like to prevent corrosion due to an electrolyte solution. Inside the battery can 602, the battery element in which the positive electrode, the negative electrode, and the separator are wound is interposed between a pair of insulating plates 608 and 609 that face each other. Furthermore, a nonaqueous electrolyte solution (not illustrated) is injected inside the battery can 602 provided with the battery element. The secondary battery is composed of a positive electrode containing an active material such as lithium cobalt oxide ($LiCoO_2$) or lithium iron phosphate ($LiFePO_4$), a negative electrode composed of a carbon material such as graphite capable of occluding and releasing lithium ions, a nonaqueous electrolytic solution in which an electrolyte composed of a lithium salt such as $LiBF_4$ or $LiPF_6$ is dissolved in an organic solvent such as ethylene carbonate or diethyl carbonate, and the like.

Figure 12C:
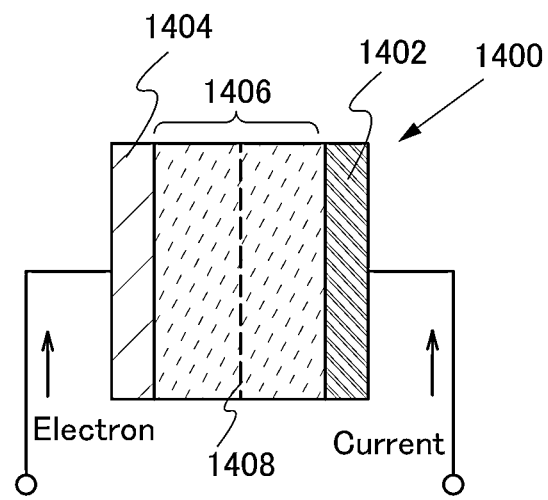
FIG. 12C is a diagram illustrating an example of a secondary battery.

A charger is connected to two terminals illustrated in FIG. 12C, and a storage battery 1400 is charged. In FIG. 12C, 1406 denotes an electrolyte solution and 1408 denotes a separator. As the charge of the storage battery 1400 proceeds, a potential difference between electrodes increases. The positive direction in FIG. 12C is the direction which a current flows from a terminal outside the storage battery 1400 to a positive electrode 1402; from the positive electrode 1402 to a negative electrode 1404 in the storage battery 1400; and from the negative electrode to a terminal outside the storage battery 1400. In other words, the direction in which a charge current flows is regarded as the direction of a current.

The first battery 301 is composed of a module set including a plurality of secondary batteries. For example, a cylindrical secondary battery 600 illustrated in FIG. 12A is used. As illustrated in FIG. 10B, the cylindrical secondary battery 600 may be interposed between a conductive plate 613 and a conductive plate 614 to form a module. In FIG. 10(B), switches are not illustrated between the secondary batteries. A plurality of secondary batteries 600 may be connected in parallel, connected in series, or connected in series after connecting in parallel. By forming a module including the plurality of secondary batteries 600, large power can be extracted.

Figure 11A:
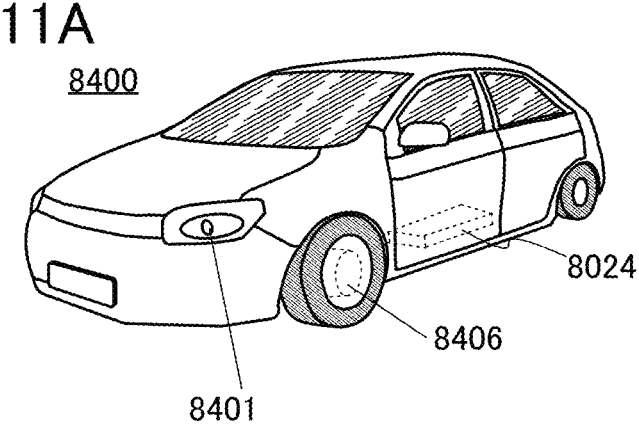
FIG. 11A, FIG. 11B, and FIG. 11C are diagrams illustrating examples of moving bodies.
Figure 11B:
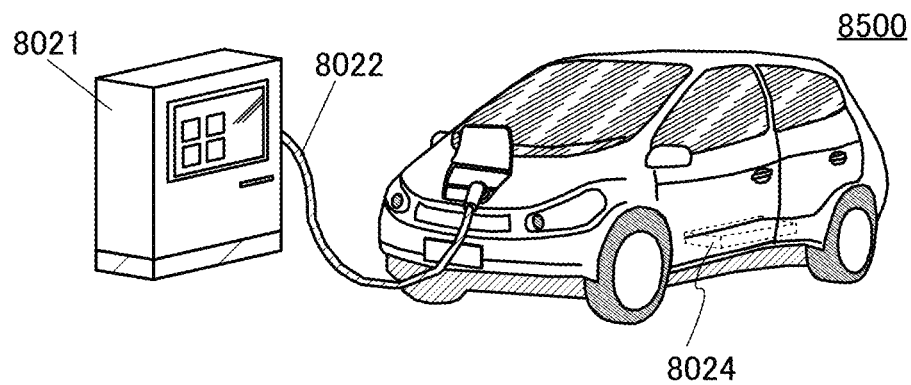
Figure 11C:
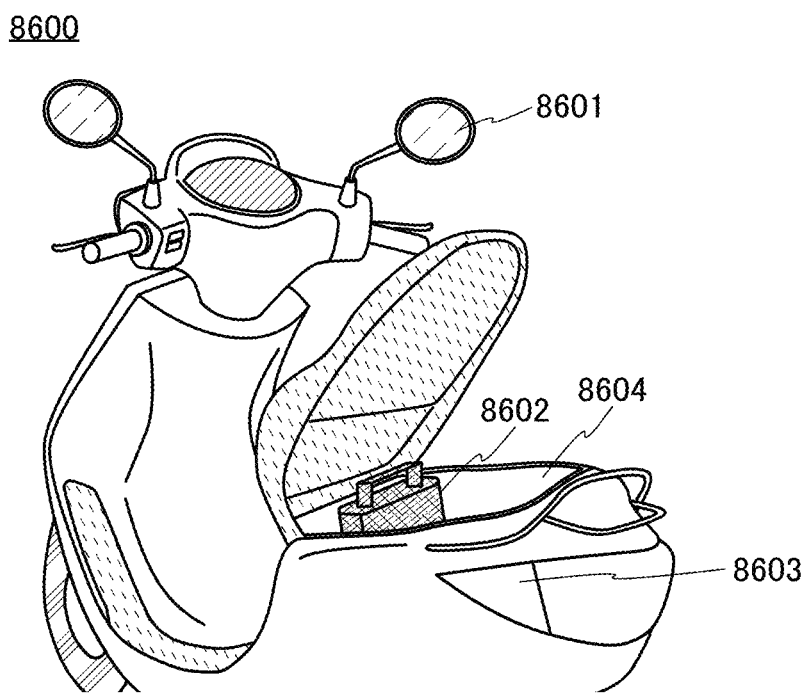

FIG. 11A, FIG. 11B, and FIG. 11C illustrate examples of vehicles each using the abnormality detection system of a secondary battery of one embodiment of the present invention. A secondary battery 8024 of an automobile 8400 illustrated in FIG. 11A not only drives an electric motor 8406 but also can supply electric power to a light-emitting device such as a headlight 8401 10 or a room light (not illustrated). For the secondary battery 8024 in the automobile 8400, the cylindrical secondary batteries 600 illustrated in FIG. 10B that are interposed between the conductive plate 613 and the conductive plate 614 to form a module can be used.

An automobile 8500 illustrated in FIG. 11B can be charged when the secondary battery included in the automobile 8500 is supplied with electric power from external charging equipment by a plug-in system, a contactless power feeding system, or the like. FIG. 11B illustrates a state in which the secondary battery 8024 incorporated in the automobile 8500 is charged with a ground-based charging apparatus 8021 through a cable 8022. Charging may be performed as appropriate by a given method such as CHAdeMO (registered trademark) or Combined Charging System as a charging method, the standard of a connector, or the like. The charging apparatus 8021 may be a charging station provided in a commercial facility or a power source in a house. For example, with a plug-in technique, the secondary battery 8024 incorporated in the automobile 8500 can be charged by power supply from the outside. Charging can be performed by converting AC power into DC power through a converter such as an AC-DC converter.

FIG. 11C is an example of a motorcycle using the secondary battery of one embodiment of the present invention. A scooter 8600 illustrated in FIG. 11C includes a secondary battery 8602, side mirrors 8601, and a direction indicator light 8603. The secondary battery 8602 can supply electricity to the direction indicator light 8603.

Furthermore, in the scooter 8600 illustrated in FIG. 11C, the secondary battery 8602 can be held in an under-seat storage 8604. The secondary battery 8602 can be stored in the under-seat storage 8604 even when the under-seat storage 8604 is small.

For the secondary battery 8602, an all-solid-state battery can be used. The secondary battery 8602 is composed of a plurality of laminated secondary batteries. FIG. 13D illustrates an example of a laminated secondary battery that uses an all-solid-state battery.

A laminated secondary battery 500 illustrated in FIG. 13D includes a positive electrode lead electrode 510 and a negative electrode lead electrode 511.

Next, the exterior body is bent. Then, the outer portions of the exterior body are bonded. For the exterior body, a laminated film in which metal foil and an organic resin film are stacked such as aluminum foil or stainless steel foil is used; and for the bonding, thermocompression is used, for example. In this manner, the laminated secondary battery 500 illustrated in FIG. 13D can be manufactured. Although an example in which one laminated film is used for the bonding is described, two laminated films may be stacked and sealed with the outer edges thereof attached to each other.

Figure 13A:
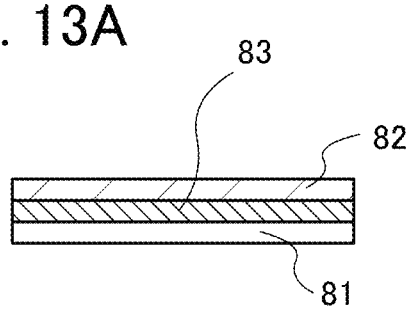
FIG. 13A is a conceptual view of a solid-state battery.

FIG. 13A is a conceptual view of a solid-state battery including a solid electrolyte layer 83 between a positive electrode 81 and a negative electrode 82. The solid-state battery include a thin-film-type all-solid-state battery and a bulk-type all-solid-state battery. The thin-film-type all-solid-state battery is obtained by stacking thin films, and the bulk-type all-solid-state battery is obtained by depositing microscopic particles.

Figure 13B:
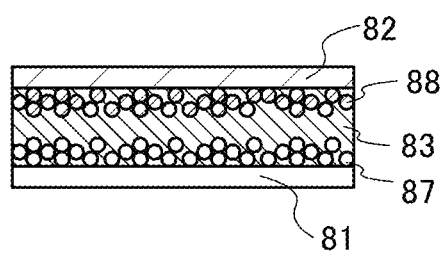
FIG. 13B illustrates an example of a bulk-type all-solid-state battery.

FIG. 13B illustrates an example of the bulk-type all-solid-state battery including a particle-state positive electrode active material 87 in the vicinity of the positive electrode 81 and a particle-state negative electrode active material 88 in the vicinity of the negative electrode 82; and the solid-state electrolyte layer 83 is positioned to fill the gaps in between. More than one kind of particles is filled between the positive electrode 81 and the negative electrode 82 with pressure pressing so that gaps are eliminated.

Figure 13C:
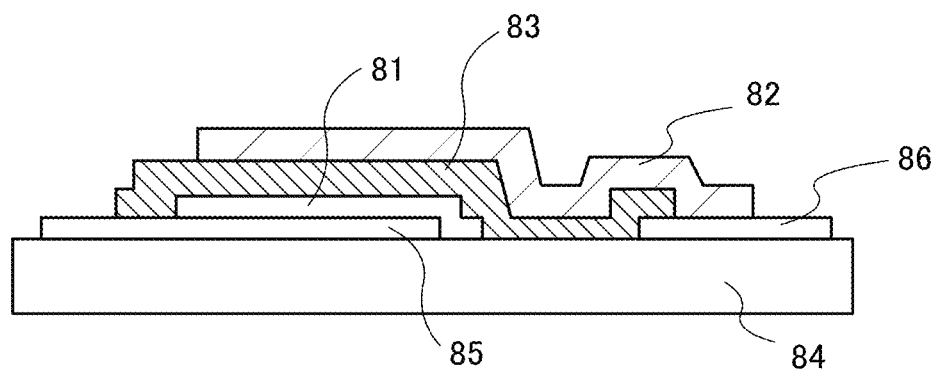
FIG. 13C illustrates an example of a thin-film-type all-solid-state battery.
Figure 13D:
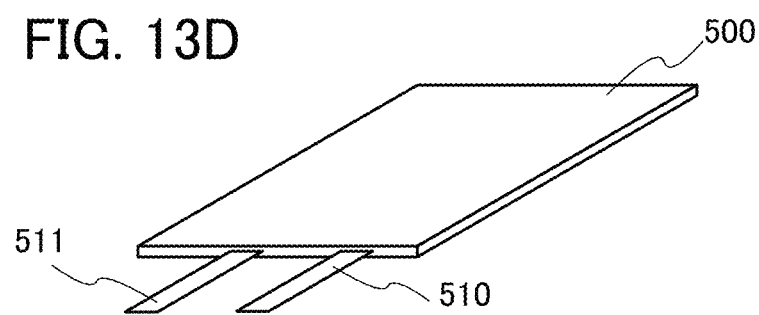
FIG. 13D illustrates an example of a laminated secondary battery.
Figure 14:
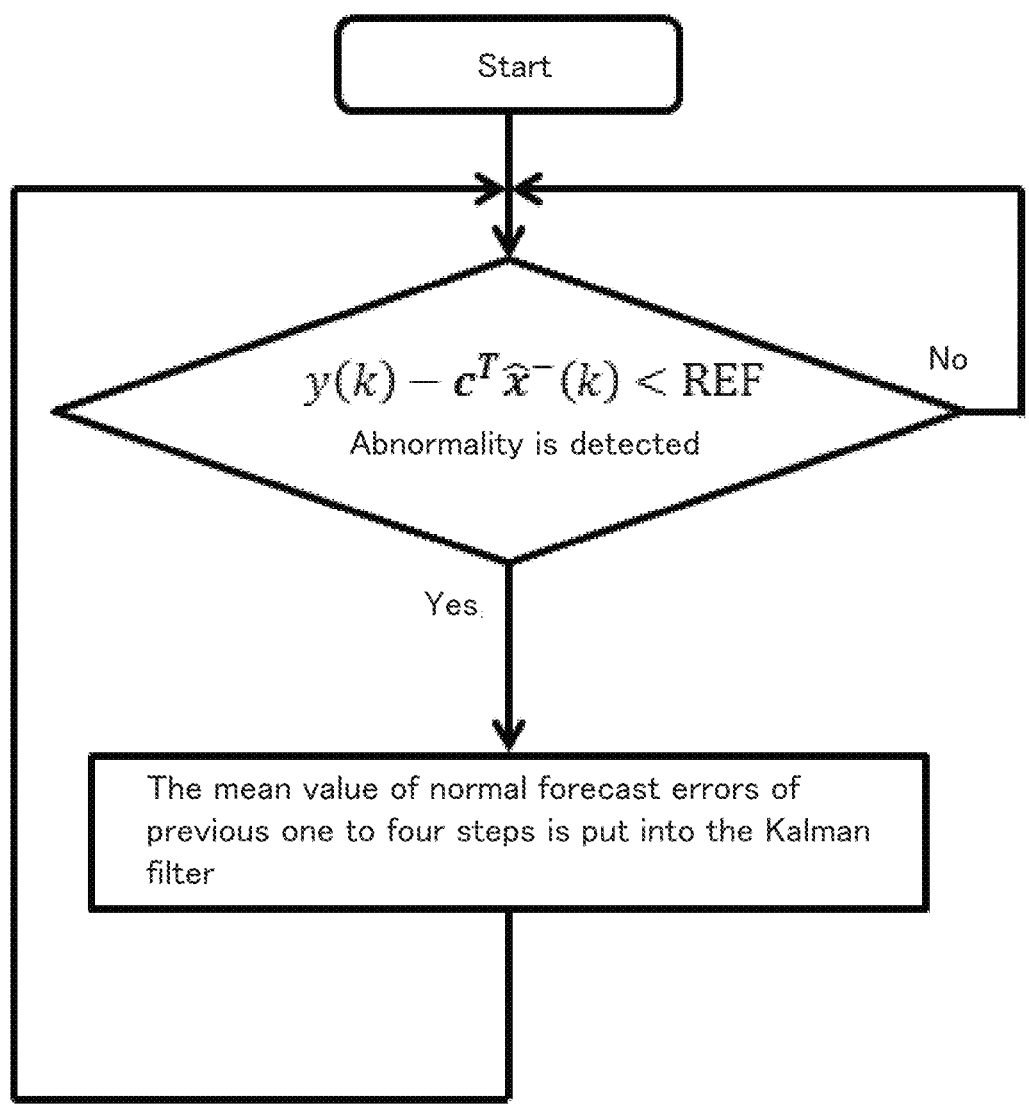
FIG. 14 is a flow chart illustrating one embodiment of the present invention.

FIG. 13C illustrates an example of a thin-film-type all-solid-state battery. Films of the thin-film-type all-solid-state battery are deposited by a gas phase method (a vacuum evaporation method, a thermal spraying method, a pulsed laser deposition method, an ion plating method, a cold spray method, an aerosol deposition method, and a sputtering method). FIG. 13C illustrates an example of fabricating a lithium-ion storage battery in a manner that wiring electrodes 85 and 86 are formed on a substrate 84, the positive electrode 81 is formed on the wiring electrode 85, the solid electrolyte layer 83 is formed on the positive electrode 81, the negative electrode 82 is formed on the solid electrolyte layer 83 and the wiring electrode 86. Examples of the substrate 84 include a ceramic substrate, a glass substrate, a plastic substrate, and a metal substrate.

Figure 15A:
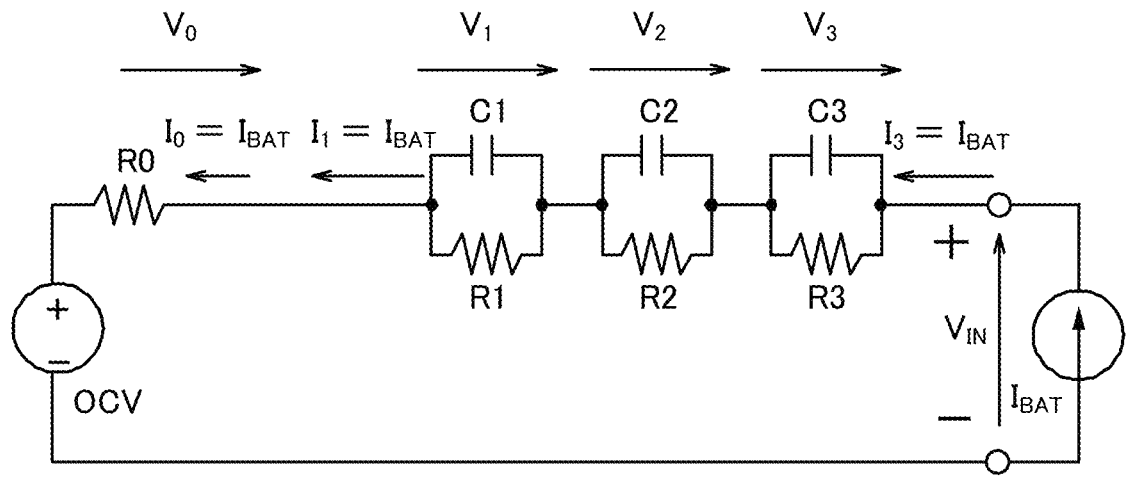
FIG. 15A is a diagram showing an equivalent circuit model illustrating one embodiment of the present invention.
Figure 15B:
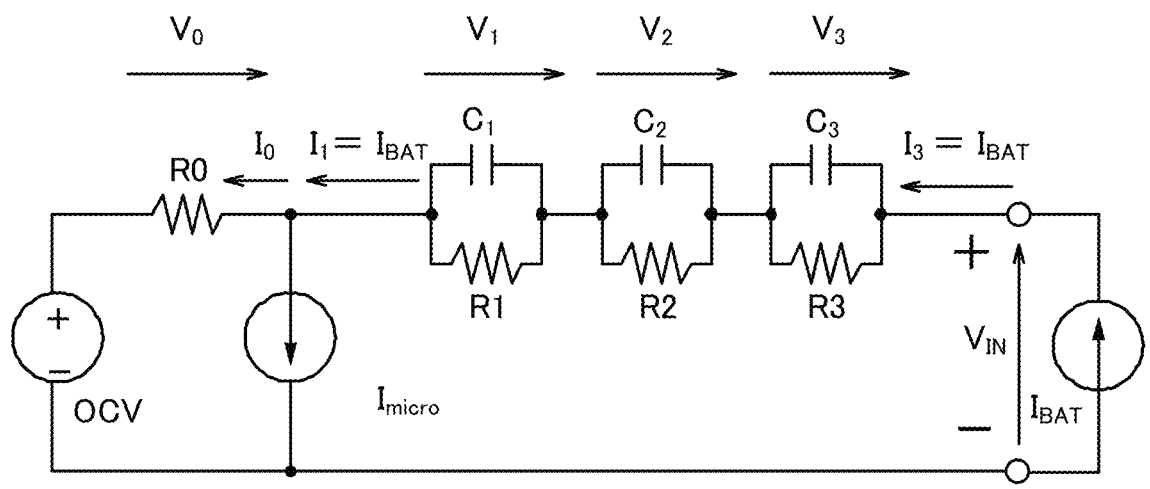
FIG. 15B is a diagram showing an equivalent circuit model illustrating another embodiment of the present invention.
Figure 16:
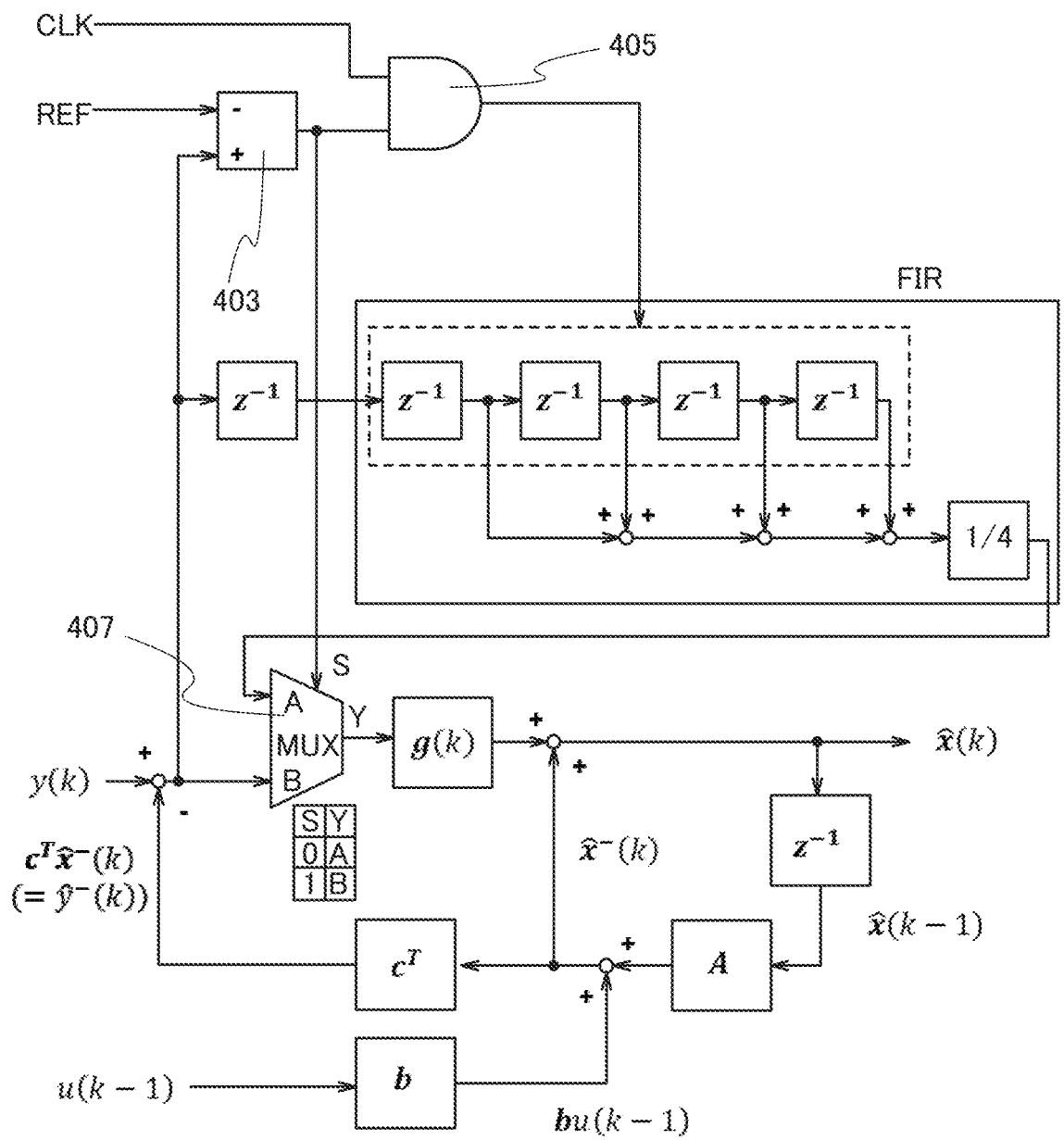
FIG. 16 is a system diagram illustrating one embodiment of the present invention.
Figure 17:
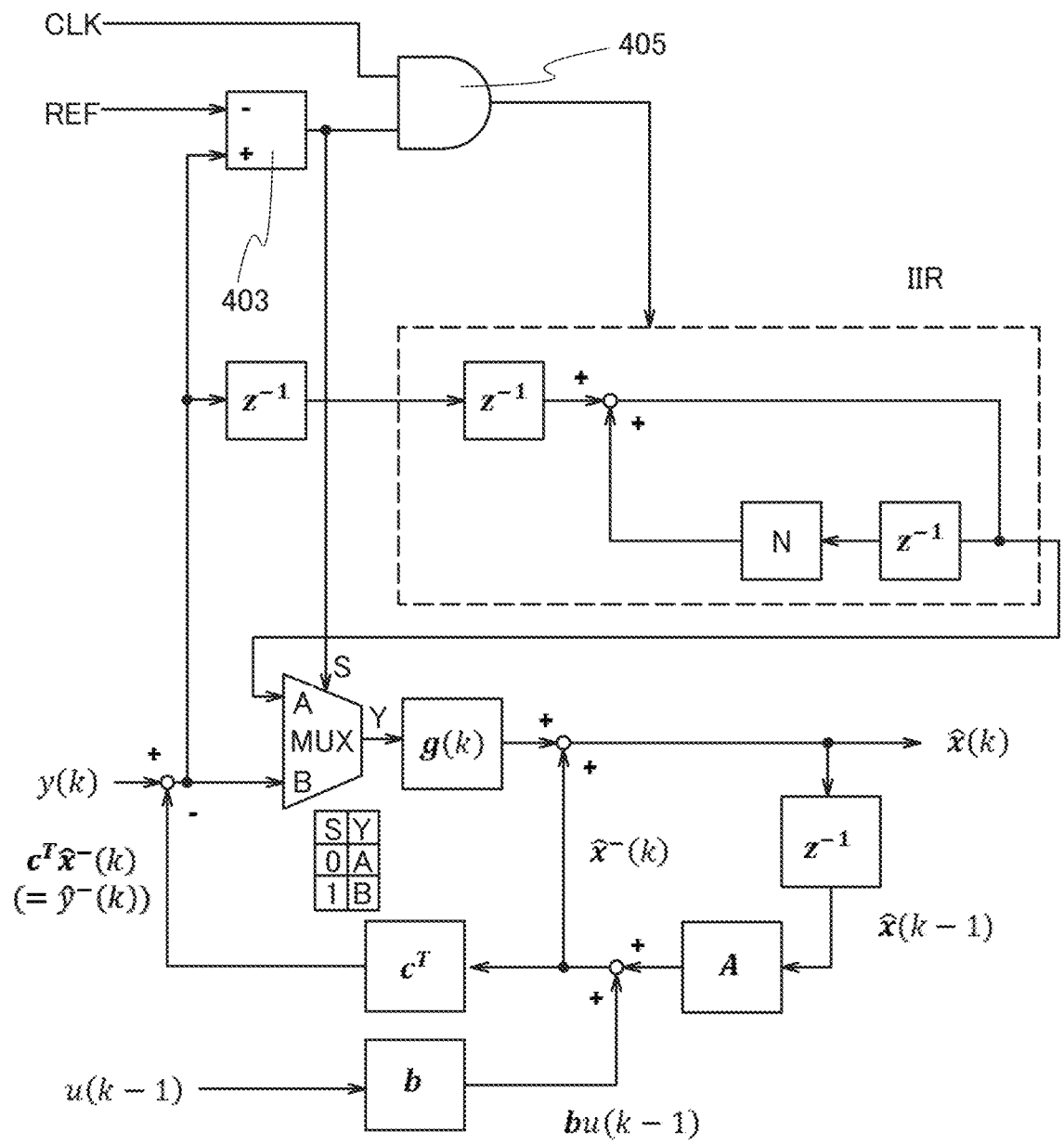
FIG. 17 is a system diagram illustrating one embodiment of the present invention.
Figure 18:
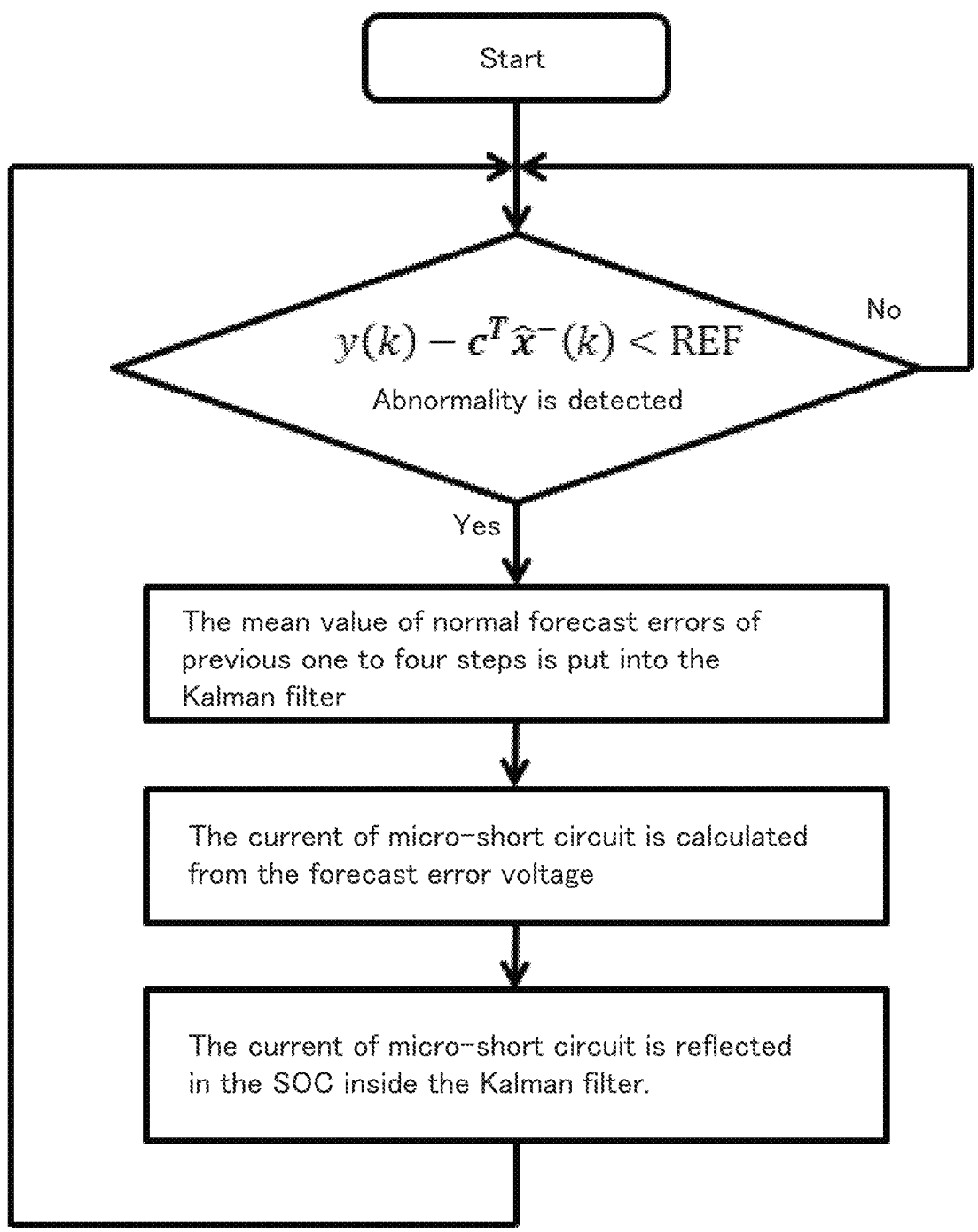
FIG. 18 is a flow chart showing one embodiment of the present invention.

The data of abnormality that is sensed is a forecast error voltage, and $I_{micro}$, which is a current when a micro-short circuit occurs, is obtained using a state equation. This is described below using an equivalent circuit model illustrated in FIG. 15A and FIG. 15B. FIG. 15A and FIG. 15B, OCV denotes a potential difference during discharge, and $V_0$, $V_1$, $V_2$, and $V_3$ denote the voltage at each point.

The above equation expresses the state variable x(k) in a circuit in FIG. 15A. FIG. 15A illustrates an equivalent circuit model corresponding to the state before a micro-short circuit occurs.

Next, a state when a micro-short circuit occurs is regarded as an equivalent circuit model illustrated in FIG. 15B, and calculation procedures are described below.

$$V_0(k+1) = R_0(k) \times I_0 \quad \text{[Equation 12]}$$

The equation above is a relational equation in the case where the time when a micro-short circuit occurs is represented by k+1. In addition, the current at each point can be expressed by the following.

$$I_1 = I_2 = I_3 = I_{BAT}(k) \quad \text{[Equation 13]}$$

The voltage $V_1$ applied to the resistance $R_1$ and the capacity $C_1$ is expressed by the following equation.

$$V_1(k+1) = \left(1 - \frac{T_S}{C_1 R_1}\right) \times V_1(k) + \frac{I_{BAT}(k)}{C_1} \quad \text{[Equation 14]}$$

The voltage $V_2$ applied to the resistance $R_2$ and the capacity $C_2$ is expressed by the following equation.

$$V_2(k+1) = \left(1 - \frac{T_S}{C_2 R_2}\right) \times V_2(k) + \frac{I_{BAT}(k)}{C_2} \quad \text{[Equation 15]}$$

The voltage $V_3$ applied to the resistance $R_3$ and the capacity $C_3$ is expressed by the following equation.

$$V_3(k+1) = \left(1 - \frac{T_S}{C_3 R_3}\right) \times V_3(k) + \frac{I_{BAT}(k)}{C_3} \quad \text{[Equation 16]}$$

In the case where in the above equations, a numerical value shown below is significantly smaller than 1 or accuracy is not substantially required, the value shown below may be 1.

$$1 - \frac{T_S}{C_N R_N} \quad \text{[Equation 17]}$$

In the case where the above equation is 1, the amount of calculation can be reduced.

$$\begin{aligned} I_{micro} &= I_1 - I_0 \quad \text{[Equation 18]} \\ &= I_{BAT}(k) - \frac{V_0(k+1)}{R_0(k)} \\ &= I_{BAT}(k) - \frac{V_{IN} - \{V_1(k+1) + V_2(k+1) + V_3(k+1) + V_{ocv}(k)\}}{R_0(k)} \end{aligned}$$

A current when a micro-short circuit occurs ($I_{micro}$) can be found by calculating the above equation. As shown in the above equation, the current when a micro-short circuit occurs is calculated by using a voltage $V_{IN}$ including $R_0$, which is estimated in the previous one step, OCV and the forecast error voltage, and an observation value of the current $I_{BAT}$. $R_0(k)$ is a covariance of the forecast error $$SOC(\hat{k}) = SOC(k) - \frac{T_S \times I_{micro}}{FCC} \quad \text{[Equation 19]}$$

SOC(k) in the above equation corresponds to SOC data inside the Kalman filter at the prior-estimate prediction step. The current when a micro-short circuit occurs can be reflected in the SOC inside the Kalman filter by replacing the value on the left side in the equation above with the SOC data inside the Kalman filter just before the filtering step.

For the estimation processing that performs calculation of the SOC, in transferring a program that can execute the above equation to a microcomputer or a microprocessor, the SOC can be calculated.

This embodiment can be combined with the other embodiments as appropriate.

Example 1

Figure 7:
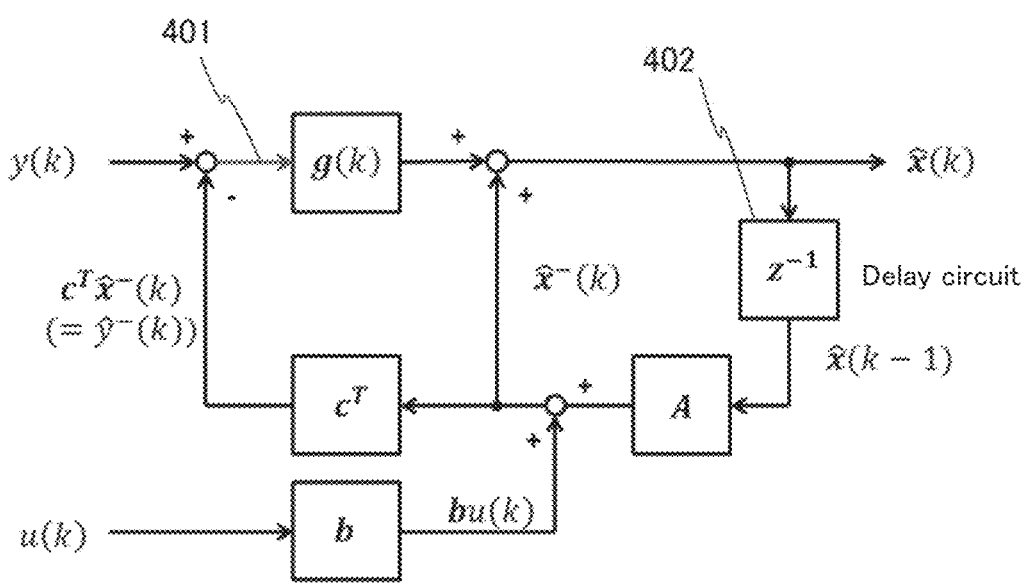
FIG. 7 is a functional block diagram illustrating one embodiment of the present invention.

FIG. 7 illustrates an example of a functional block that performs calculation of the Kalman filter. Except for not having a comparator, FIG. 7 is the same as Embodiment 1. A value of voltage difference denoted by a reference numeral 401 in FIG. 7 is important in the case where a micro-short circuit occurs, and abnormality sensing of a secondary battery is performed by monitoring this value.

A simulation is conducted using data where a pseudo-current that generates a micro-short circuit periodically is created.

Figure 8:
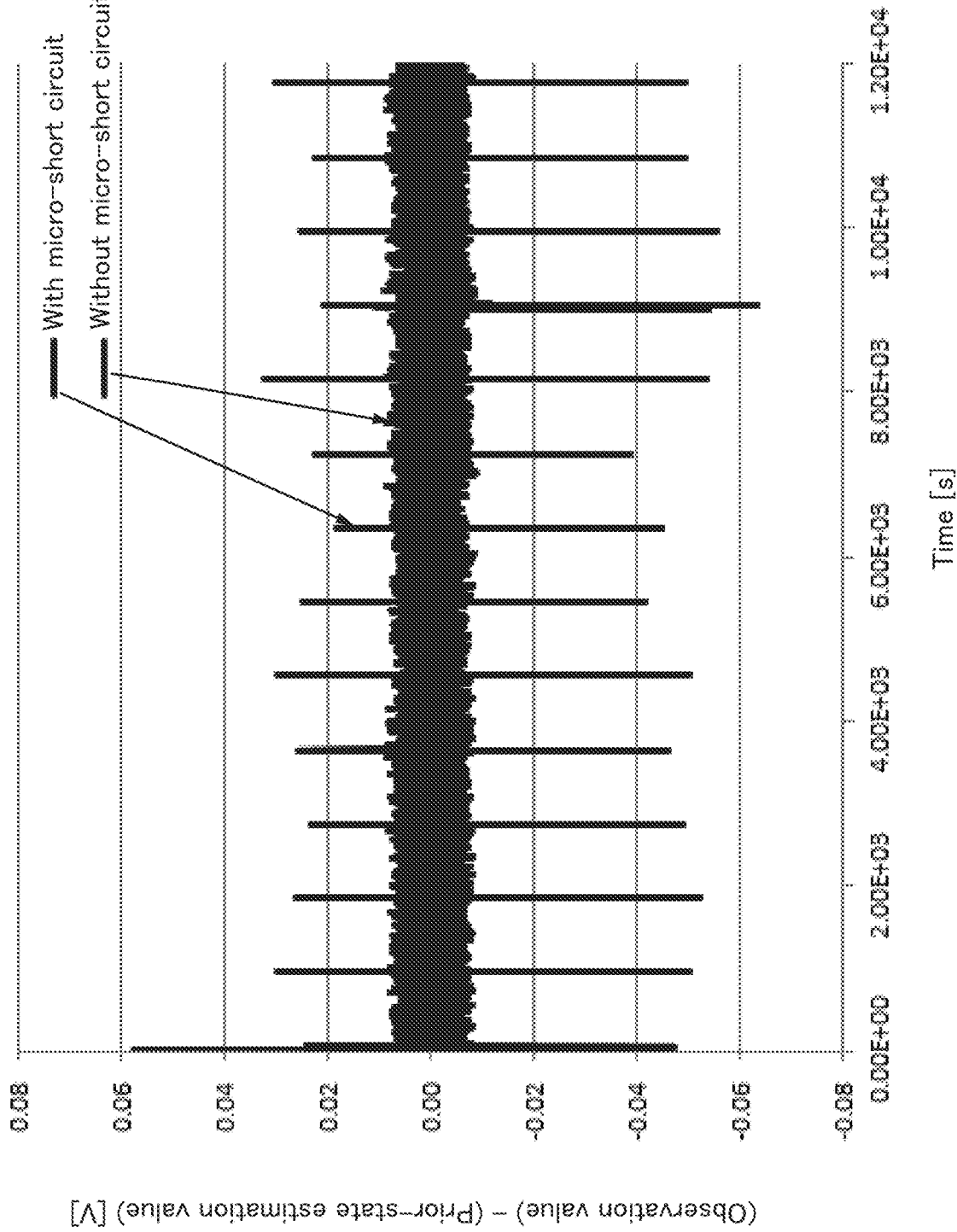
FIG. 8 is a graph showing a simulation result using a measurement model illustrating one embodiment of the present invention.

FIG. 8 shows the simulation results; the horizontal axis represents time and the vertical axis represents voltage difference, specifically a difference (voltage difference) between an observation value (voltage) and a voltage that is estimated using a prior-state variable.

In FIG. 8, data in which overshoots are observed periodically on the positive side and on the negative side is data with a micro-short circuit. Data in which an overshoot is observed only on the negative side is data without a micro-short circuit, and is a comparative example. The point where an overshoot is observed only on the negative side corresponds to the point where a voltage changes when switching from charge to discharge. In the comparative example in FIG. 8, the point where overshoots are observed only on the negative side is −0.0213 V, hence when a value larger than this value, for example, when −0.03 V is set as the threshold value, the value can be regarded as an error of margin and be prevented from being sensed as an abnormality.

Figure 9:
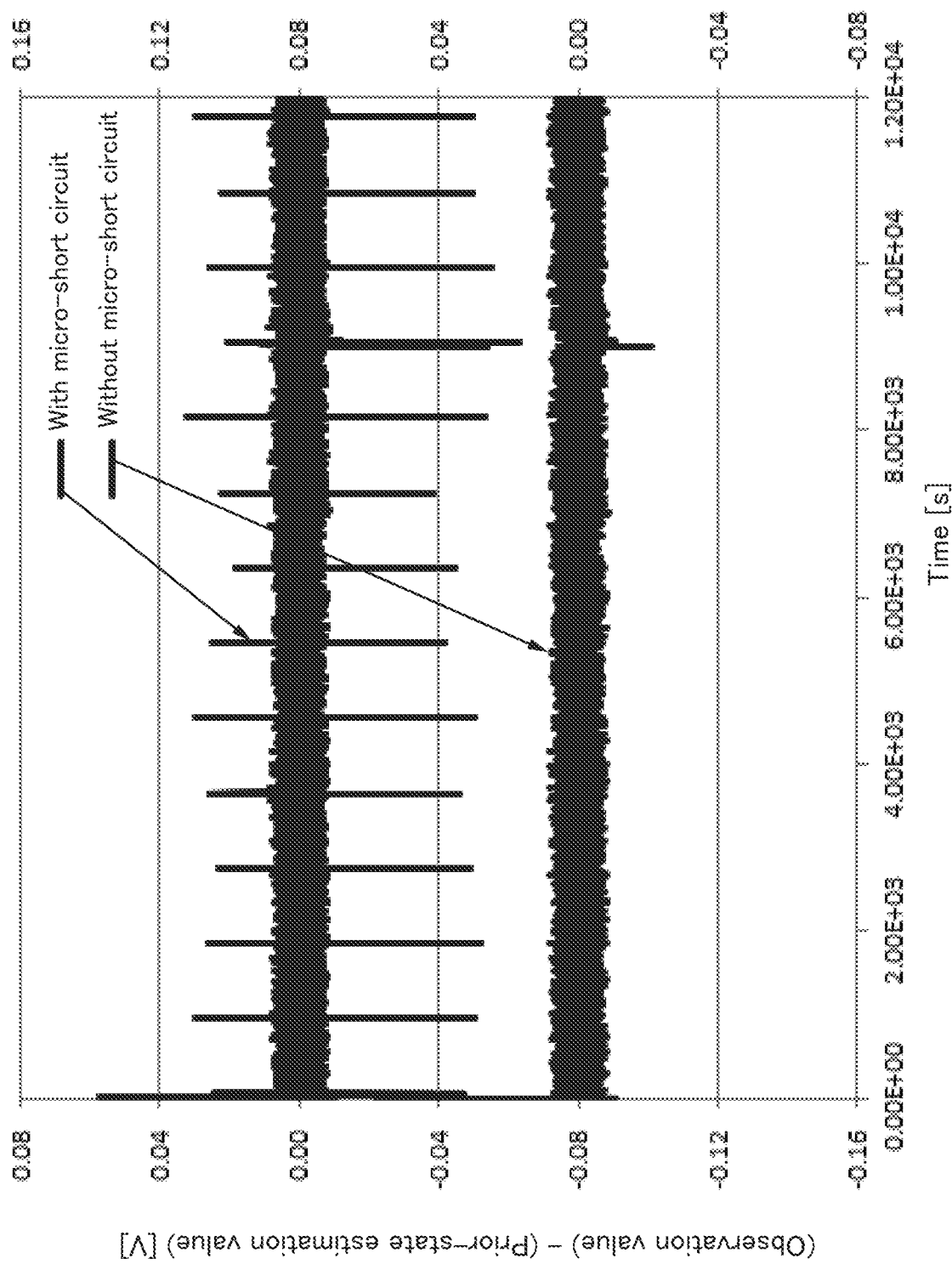
FIG. 9 is a graph showing a simulation result using a measurement model illustrating one embodiment of the present invention.

Note that in FIG. 9, data in FIG. 8 is edited, and the vertical axis is split into left and right for easy viewing. Data used for verification in FIG. 8 is data in which waveforms of a micro-short circuit are input regularly, and although in FIG. 8 the micro-short circuit is generated 13 times, in an actual secondary battery, micro-short circuits occur randomly, and the sizes of the peaks change depending on the state of usage (charge or discharge) of the secondary battery. In any case, when a micro-short circuit is sensed, the degradation of the secondary battery is accelerated or the secondary battery becomes unusable; hence, notifying users of a warning of sensing is useful. Although the cause of the occurrence of a micro-short circuit has not been identified yet, there is a theory that this is due to entry of metal powder at manufacture, and even though an abnormality is not sensed right after manufacture, it is possible that in repeating charge and discharge the abnormal portion (conductive portion) is formed and grown, leading to the occurrence of the micro-short circuit. When a secondary battery in which a micro-short circuit has occurred is charged and discharged, degradation progresses rapidly, and the secondary battery may suddenly become unusable. Thus, the method of the present invention capable of sensing a micro-short circuit is useful.

In a Kalman filter, input values of a battery are input to a battery equivalent circuit model and output values are compared; when there is a difference, a Kalman gain is applied to the difference and feedback is given, after which the battery equivalent circuit model is corrected so that the error becomes minimum. This is repeated in succession.

Note that the Kalman filter is a system in which data is matched in succession, and the errors near the beginning in FIG. 8 and FIG. 9 can be ignored.

In the value of voltage difference denoted by the reference numeral 401 in FIG. 7, −0.0631 V is set as the minimum value and +0.0324 V is set as the maximum value. In addition, a peak point that is close to 0 in a point at which a micro-short circuit is generated is −0.0386 V on the negative side and +0.0186 V on the positive side. Hence, in order to sense all micro-short circuits, the sensing may be performed using a comparator or the like with the threshold value set at −0.0386 V on the negative side and +0.0186 V on the positive side. Since these values vary depending on the secondary battery that is used, simulation is performed as appropriate in advance using the characteristics data of the secondary battery that is used, and the threshold value may be determined on the basis of the results.

Note that the simulation results in FIG. 8 and FIG. 9 are obtained by using LTspice (Simulation program with integrated circuit emphasis), which is a circuit simulator provided by Analog Devices.

REFERENCE NUMERALS

1 comparator, 2 comparator, 81: positive electrode, 82: negative electrode, 83: solid electrolyte layer, 84: substrate, 85: wiring electrode, 86: wiring electrode, 87: positive electrode active material, 88: negative electrode active material, 300: abnormality-monitor unit, 301: battery, 302: battery controller, 303: motor controller, 304: motor, 305: gear, 306: DC-DC circuit, 307: electric power steering, 308: heater, 309: defogger, 310: DC-DC circuit, 311: battery, 312:

inverter, 313: audio, 314: power window, 315: lamps, 316: tire, 400: micro-short circuit model, 401: reference numeral, 402: delay circuit, 403: comparator, 404: neural network unit, 405: AND circuit, 407: multiplexer, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 613: conductive plate, 614: conductive plate, 1400: storage battery, 1402: positive electrode, 1404: negative electrode, 8021: charging apparatus, 8022: cable, 8024: secondary battery, 8400: automobile, 8401: headlight, 8406: electric motor, 8500: automobile, 8600: scooter, 8601: side mirror, 8602: secondary battery, 8603: direction indicator light, 8604: under-seat storage

What is claimed is:

1. A charging state estimation device of a secondary battery, comprising:
   a first sensing circuit configured to sense a first voltage value of the secondary battery,
   a calculation unit configured to calculate a second voltage value, and
   a determination unit,
   wherein the determination unit comprises one or a plurality of comparators, a multiplexer, and a delay circuit,
   wherein an output terminal of the comparator is electrically connected to a first input terminal of an AND circuit and a first input terminal of the multiplexer,
   wherein an output terminal of the AND circuit is electrically connected to a second input terminal of the multiplexer through a filter,
   wherein an output terminal of the multiplexer is electrically connected to the calculation unit,
   wherein a reference voltage is input to a first input terminal of the comparator,
   wherein a voltage reference is input to a second input terminal of the comparator and a third input terminal of the multiplexer, and
   wherein the voltage reference corresponds to a difference between the first voltage value and the second voltage value.

2. The charging state estimation device according to claim 1,
   wherein a regression model is used in the calculation unit, and
   wherein the regression model is a Kalman filter on the basis of a state equation.

3. The charging state estimation device according to claim 1, further comprising a second sensing circuit configured to sense a current value of the secondary battery to be a second observation value.

4. A semiconductor device comprising:
   a comparator;
   an AND circuit;
   a multiplexer; and
   a calculation unit,
   wherein an output terminal of the comparator is electrically connected to a first input terminal of the AND circuit and a first input terminal of the multiplexer,
   wherein an output terminal of the AND circuit is electrically connected to a second input terminal of the multiplexer through a filter,
   wherein an output terminal of the multiplexer is electrically connected to the calculation unit,
   wherein a reference voltage is input to a first input terminal of the comparator,
   wherein a voltage reference is input to a second input terminal of the comparator and a third input terminal of the multiplexer, and
   wherein the voltage reference corresponds to a difference between a voltage value output from the calculation unit and a voltage value of a secondary battery.

5. The semiconductor device according to claim 4,
   wherein a clock signal is input to a second input terminal of the AND circuit.

6. The semiconductor device according to claim 4,
   wherein the voltage value of the secondary battery is sensed by a sensing circuit.

* * * * *